(12) United States Patent
Murata et al.

(10) Patent No.: US 11,270,727 B2
(45) Date of Patent: *Mar. 8, 2022

(54) SINGLE REEL MAGNETIC TAPE CARTRIDGE WITH PREDEFINED TAPE WIDTH DIFFERENCE AND SERVO BAND INTERVAL DIFFERENCE

(71) Applicant: FUJIFILM Corporation, Tokyo (JP)

(72) Inventors: Yuto Murata, Minami-ashigara (JP); Norihito Kasada, Minami-ashigara (JP); Yusuke Kagawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 16/825,534

(22) Filed: Mar. 20, 2020

(65) Prior Publication Data
US 2020/0302964 A1 Sep. 24, 2020

(30) Foreign Application Priority Data
Mar. 22, 2019 (JP) .............................. JP2019-054332

(51) Int. Cl.
*G11B 5/735* (2006.01)
*G11B 5/733* (2006.01)
(Continued)

(52) U.S. Cl.
CPC .............. *G11B 5/735* (2013.01); *G11B 5/733* (2013.01)

(58) Field of Classification Search
CPC ..... G11B 5/712; G11B 5/735; G11B 5/70678; G11B 5/7356; G11B 5/73929
See application file for complete search history.

(56) References Cited

U.S. PATENT DOCUMENTS 9,997,184 B1 * 6/2018 Bui ..................... G11B 5/0086
10,679,659 B2 6/2020 Kagawa et al.
(Continued)

FOREIGN PATENT DOCUMENTS

JP 2005-346865 A 12/2005
JP 2009-087471 A 4/2009
(Continued)

OTHER PUBLICATIONS

Brian L Weick, "Viscoelastic analysis applied to the determination of long-term creep behavior for magnetic tape materials", Journal of Applied Polymer Science, vol. 102, No. 2, Oct. 15, 2006, pp. 1106-1128, XP55596456 (23 pages total).
(Continued)

*Primary Examiner* — Holly Rickman
*Assistant Examiner* — Linda N Chau
(74) *Attorney, Agent, or Firm* — Sughrue Mion, PLLC

(57) ABSTRACT

In the magnetic tape cartridge, a tape has a tape thickness of 5.3 μm or less, and a difference $W_{inner}-W_{outer}$ between a tape width $W_{inner}$ at a position of 50 m±1 m from a tape inner end and a tape width $W_{outer}$ at a position of 50 m±1 m from a tape outer end is 4.1 μm to 19.9 μm as a value measured on 100th day from a date of magnetic tape cartridge manufacture, and a difference $G_{inner}-G_{outer}$ between a servo band interval $G_{inner}$ in a range of 49 m to 51 m from the tape inner end and a servo band interval $G_{outer}$ in a range of 49 m to 51 m from the tape outer end is −3.9 μm to 0.0 μm as a value measured on 100th day from the date of magnetic tape cartridge manufacture.

20 Claims, 3 Drawing Sheets

(51) Int. Cl.
    *G11B 23/107*     (2006.01)
    *G11B 5/78*     (2006.01)
    *G11B 5/70*     (2006.01)
    *G11B 5/73*     (2006.01)

(56) References Cited

U.S. PATENT DOCUMENTS

| | | |
|---|---|---|
| 2004/0021024 A1 | 2/2004 | Yoshimura et al. |
| 2004/0089564 A1 | 5/2004 | Kuse et al. |
| 2005/0153170 A1 | 7/2005 | Inoue et al. |
| 2006/0153977 A1 | 7/2006 | Uchiumi |
| 2009/0086369 A1 | 4/2009 | Ishida et al. |
| 2010/0247968 A1 | 9/2010 | Ishikawa et al. |
| 2013/0172515 A1 | 7/2013 | Horie et al. |
| 2015/0111066 A1* | 4/2015 | Terakawa ............... G11B 5/70 |
| | | 428/836.2 |
| 2017/0372744 A1* | 12/2017 | Ozawa ................... G11B 5/70 |
| 2019/0259417 A1 | 8/2019 | Kagawa et al. |
| 2020/0243111 A1 | 7/2020 | Kagawa et al. |
| 2020/0302963 A1 | 9/2020 | Murata et al. |

FOREIGN PATENT DOCUMENTS

| | | |
|---|---|---|
| JP | 2010-238346 A | 10/2010 |
| WO | 2012/043281 A1 | 4/2012 |

OTHER PUBLICATIONS

Brian L Weick, Ph.D., "Dimensional Stability of Magnetic Tape", Dec. 10, 2015, pp. 1-13, XP55596448, retrieved from the Internet: URL: https://www.fujifilmusa.com/products/tape_data_storage/case_studies/pdf/Dimensional_Stability.pdf [retrieved on Jun. 13, 2019] (13 pages total).

Extended European Search Report (EESR) dated Jun. 26, 2019, from the European Patent Office in European Application No. 19158109.9, corresponding to U.S. Appl. No. 16/281,169.

Office Action dated Mar. 9, 2021 in U.S. Appl. No. 16/825,360.

Office Action dated Sep. 17, 2019 in U.S. Appl. No. 16/281,169.

Office Action dated Dec. 4, 2019 in U.S. Appl. No. 16/281,169.

Communication dated Jul. 14, 2020 from the European Patent Office in Application No. 19158109.9, corresponding to U.S. Appl. No. 16/281,169.

Office Action dated Oct. 6, 2020 from the Japanese Patent Office in Japanese Application No. 2019-003415, corresponding to U.S. Appl. No. 16/849,154.

Office Action dated Jun. 18, 2020 in U.S. Appl. No. 16/849,154.

Notice of Allowance dated Sep. 23, 2020 in U.S. Appl. No. 16/849,154.

Notice of Allowance dated Nov. 3, 2021 in U.S. Appl. No. 16/825,360.

* cited by examiner

MT

SINGLE REEL MAGNETIC TAPE CARTRIDGE WITH PREDEFINED TAPE WIDTH DIFFERENCE AND SERVO BAND INTERVAL DIFFERENCE

CROSS-REFERENCE TO RELATED APPLICATIONS

This application claims priority under 35 U.S.C 119 to Japanese Patent Application No. 2019-054332 filed on Mar. 22, 2019. The above application is hereby expressly incorporated by reference, in its entirety, into the present application.

BACKGROUND OF THE INVENTION

1. Field of the Invention

The present invention relates to a magnetic tape cartridge and a magnetic tape device.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up or archives (for example, see JP2005-346865A).

The recording and reproducing of data on the magnetic tape are normally performed by setting a magnetic tape cartridge accommodating a magnetic tape wound around a reel, on a magnetic tape device which is called a drive, causing the magnetic tape to run in the magnetic tape device, and bringing a surface of a tape (surface of a magnetic layer) and a magnetic head into contact with each other and to slide on each other.

SUMMARY OF THE INVENTION

Data recording on the magnetic tape is usually performed by running the magnetic tape in the magnetic tape device, causing the magnetic head to follow a data band of the magnetic tape, and recording data on the data band. Accordingly, a data track is formed on the data band. Also, in a case of reproducing the recorded data, the magnetic tape is caused to run in a magnetic tape device, a magnetic head is caused to follow the data band of the magnetic tape, and the data recorded on the data band is read. In a case where accuracy of the magnetic head following the data band during the reproduction is low, a reproducing error may occur.

Meanwhile, an increase in recording capacity (high capacity) of the magnetic tape is required in accordance with a great increase in information content in recent years. As means for realizing high capacity, a technology of decreasing a thickness of the magnetic tape (hereinafter, also referred to as "thinning") and increasing a length of the magnetic tape accommodated in 1 reel of the magnetic tape cartridge is used. However, according to the studies of the inventors, in a case where the thickness of the magnetic tape is decreased, a phenomenon that a reproducing error easily occurs is seen.

An object of one aspect of the invention is to achieve both of thinning of the magnetic tape and suppression of reproducing error occurrence.

One aspect of the invention relates to a magnetic tape cartridge of a single reel type in which a magnetic tape is wound around a reel, in which the magnetic tape includes a non-magnetic support and a magnetic layer containing a ferromagnetic powder, and has a tape thickness of 5.3 μm or less, the magnetic layer includes a plurality of servo bands, a difference $W_{inner}-W_{outer}$ between a tape width $W_{inner}$ at a position of 50 m±1 m from a tape inner end and a tape width $W_{outer}$ at a position of 50 m±1 m from a tape outer end is 4.1 μm to 19.9 μm as a value measured on 100th day from a date of magnetic tape cartridge manufacture, and a difference $G_{inner}-G_{outer}$ between a servo band interval $G_{inner}$ in a range of 49 m to 51 m from the tape inner end and a servo band interval $G_{outer}$ in a range of 49 m to 51 m from the tape outer end is $-3.9$ μm to 0.0 μm as a value measured on 100th day from the date of magnetic tape cartridge manufacture.

In one aspect, a tape width deformation rate of the magnetic tape measured within 20 minutes, after the magnetic tape is stored in a dry environment at a temperature of 52° C. for 24 hours in a state where a load of 100 g is applied in a tape longitudinal direction and then the load is removed, may be 400 ppm or less. Here, the tape width deformation rate is a value obtained by starting the storage on 100th day from the date of magnetic tape cartridge manufacture.

In one aspect, the magnetic tape may include a non-magnetic layer containing a non-magnetic powder between the non-magnetic support and the magnetic layer.

In one aspect, the magnetic tape may include a back coating layer containing a non-magnetic powder on a surface side of the non-magnetic support opposite to a surface side thereof provided with the magnetic layer.

In one aspect, the non-magnetic support may be a polyethylene naphthalate support.

In one aspect, the non-magnetic support may be an aromatic polyamide support.

In one aspect, the non-magnetic support may be a polyethylene terephthalate support.

In one aspect, the ferromagnetic powder may be a hexagonal barium ferrite powder.

In one aspect, the ferromagnetic powder may be a hexagonal strontium ferrite powder.

In one aspect, the ferromagnetic powder may be an ε-iron oxide powder.

One aspect of the invention relates to a magnetic tape device comprising the magnetic tape cartridge and a magnetic head.

According to one aspect of the invention, it is possible to provide a magnetic tape cartridge including a magnetic tape having a thinned tape thickness 5.3 μm or less and capable of suppressing occurrence of a reproducing error during the reproduction of data recorded on the magnetic tape. According to one aspect, it is possible to provide a magnetic tape device including the magnetic tape cartridge.

DESCRIPTION OF THE PREFERRED EMBODIMENTS

Magnetic Tape Cartridge

Figure 1:
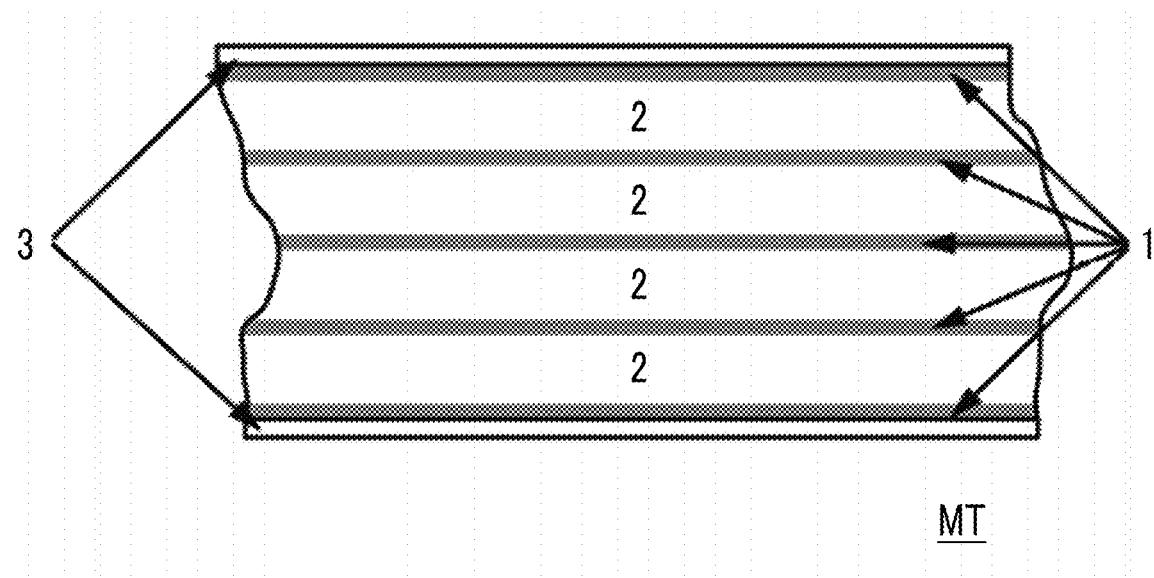
FIG. 1 shows arrangement examples of a data band and a servo band.

According to one aspect of the invention, there is provided a magnetic tape cartridge of a single reel type in which a magnetic tape is wound around a reel, in which the magnetic tape includes a non-magnetic support and a magnetic layer containing a ferromagnetic powder, and has a tape thickness of 5.3 µm or less, the magnetic layer includes a plurality of servo bands, a difference $W_{inner}-W_{outer}$ (hereinafter, also referred to as a "tape width difference") between a tape width $W_{inner}$ at a position of 50 m±1 m from a tape inner end and a tape width $W_{outer}$ at a position of 50 m±1 m from a tape outer end is 4.1 µm to 19.9 µm as a value measured on 100th day from the date of magnetic tape cartridge manufacture, and a difference ($G_{inner}-G_{outer}$) (hereinafter, also referred to as a "servo band interval difference") between a servo band interval $G_{inner}$ in a range of 49 m to 51 m from the tape inner end and a servo band interval $G_{outer}$ in a range of 49 m to 51 m from the tape outer end is −3.9 µm to 0.0 µm as a value measured on 100th day from the date of magnetic tape cartridge manufacture.

One reason of the occurrence of a reproducing error in a case of reproducing data recorded on the magnetic tape is a temporal change of a dimension of the magnetic tape in a width direction from the recording to the reproducing of the data on the magnetic tape. Regarding the dimensional change of the magnetic tape in a width direction, in JP2005-346865A described above, an increase in dimensional stability by providing a reinforcing layer has been proposed (for example, see paragraphs 0014 and 0054 of JP2005-346865A). In other words, this proposal also aims to provide a magnetic tape which is hardly deformed.

In regards to this point, the inventors have made intensive studies about the dimensional change of the magnetic tape accommodated in the magnetic tape cartridge and obtained the following new findings.

The magnetic tape cartridge is manufactured by wounding a magnetic tape, which is obtained by slitting a long magnetic tape raw material to have a regulated width, around a reel of the magnetic tape cartridge. As the configuration of the cartridge, a single reel type including one reel and a twin reel type including two reels are used, and in recent years, a single reel type magnetic tape cartridge is widely used. The inventors have made intensive studies about the temporal deformation of the magnetic tape in the single reel type magnetic tape cartridge, and it is clear that a phenomenon in that a portion close to the reel (an inner portion) is deformed to have a wider width compared to an initial stage due to compressive stress in a tape thickness direction and a portion far from the reel (an outer portion) is deformed to have a narrower width compared to the initial stage due to tensile stress in a tape longitudinal direction, significantly occurs in the thinned magnetic tape (specifically, the tape thickness is 5.3 µm or less), and tape widths of the inner portion and the outer portion are significantly different after time. As the reason thereof, the inventors have surmised that, in a case where the magnetic tape is thinned, the compressive stress or the tensile stress applied to each position of the magnetic tape further increases, even in a case where the tension applied to the magnetic tape is same, and as a result, the deformation to have wider or narrower width compared to the initial stage easily occurs. In addition, in a case where the magnetic tape is thinned for realizing high capacity and the length of the magnetic tape accommodated in one reel of the magnetic tape cartridge is increased, the number of magnetic tapes in the magnetic tape cartridge increases. As a result, it is thought that the inner portion (portion close to the reel) of the magnetic tape is compressed more strongly, and therefore, it is surmised that the phenomenon that the inner portion is deformed to have wider width compared to the initial stage more significantly occurs.

From the above findings, the inventors have thought that the temporal deformation of the magnetic tape which is different between the inner portion and the outer portion after data recording described above causes difficult of causing the magnetic head to follow the data band on which data is recorded, and it becomes a reason of the reproducing error. Specifically, the inventors have thought that causing the magnetic head to follow a data band in which data is recorded by a system that performs head tracking using a servo signal (hereinafter referred to as a "servo system") becomes difficult due to the above deformation, which causes a reproducing error. In this regard, the servo system will be described below.

Among the servo systems, a magnetic servo type servo system forms the servo pattern on the magnetic layer of the magnetic tape, and performs head tracking using the servo signal obtained by magnetically reading the servo pattern. The servo pattern is usually formed before the magnetic tape is accommodated in the magnetic tape cartridge. More specifically, the head tracking using the servo signal is performed as follows, for example.

First, the servo pattern formed on the magnetic layer is read by a servo signal reading element. In accordance with the servo signal obtained by reading the servo pattern, the position of the magnetic head including an element for reproducing data is controlled in the magnetic tape device. As a result, in a case where the magnetic tape is caused to run in the magnetic tape device to reproduce the data recorded on the magnetic tape, the accuracy of causing the magnetic head to follow the data band is improved even in a case where the position of the magnetic tape fluctuates. For example, in a case where data is reproduced by running the magnetic tape in the magnetic tape device, even in a case where the position of the magnetic tape fluctuates in the width direction with respect to the magnetic head, the position of the magnetic head in the width direction of the magnetic tape in the magnetic tape device can be controlled by performing head tracking using the servo system. In this way, data recorded on the magnetic tape can be accurately reproduced in the magnetic tape device.

The above servo pattern is usually configured by arranging a plurality of a pair of non-parallel magnetic stripes (also referred to as "servo stripes") continuously in the longitudinal direction of the magnetic tape. A region along the longitudinal direction where a plurality of the servo patterns are continuously arranged is called a servo band. Stated another way, one servo band includes the servo patterns that are continuous in the longitudinal direction of the magnetic tape. A plurality of the servo bands are provided in the magnetic layer. A region interposed between two adjacent servo bands is called a data band. That is, a region between two adjacent servo bands is a data band. The recording of data on a magnetic tape is normally performed by recording a magnetic signal on a data band of a magnetic tape. Accordingly, a data track is formed on the data band.

The reason of the occurrence of an error in a case of reproducing data recorded on the magnetic tape having the servo band and the data band is that even in a case where head tracking is performed using the servo signal obtained by reading the servo pattern by the servo signal reading element, the magnetic head comprising the element for reproducing data (a reproducing element) cannot be aligned to the position where the data to be reproduced is recorded, and thus the magnetic tape device generates the error signal and is stopped. The inventors have considered that such a reproducing error is caused by the fact that the magnetic tape having the servo pattern formed on the magnetic layer is temporally deformed differently between the inner portion and the outer portion as described above in the magnetic tape cartridge, and as a result, the interval between two servo bands via the data band is also significantly different between the inner portion and the outer portion after time. Specifically, the inventors have considered that the reason of occurrence of the reproducing error is that since the interval between two adjacent servo bands becomes wider at a position near the reel (the inner portion) and narrower at the position far from the reel (the outer portion) due to the deformation of the magnetic tape, and the interval between the servo bands is significantly different between the inner portion and the outer portion. Therefore, the inventors have thought that, in a case where the deformation temporally occurring in the magnetic tape in the magnetic tape cartridge from the recording to the reproducing is caused to occur in the magnetic tape in advance, the occurrence of the reproducing error caused by the deformation temporally occurring from the recording to the reproducing in the thinned magnetic tape may be suppressed, and further made intensive studies. It was a research based on a technical idea which is completely different from a technical idea of the related art aiming to provide a magnetic tape which is hardly deformed. As a result, the inventors have found that by causing the deformation in which the tape width difference ($W_{inner}-W_{outer}$) becomes 4.1 µm to 19.9 µm on 100th day from the date of magnetic tape cartridge manufacture to occur in the magnetic tape in advance, and further, by forming the servo pattern on the magnetic layer so that the servo band interval difference ($G_{inner}-G_{outer}$) becomes −3.9 µm to 0.0 µm on 100th day from the date of magnetic tape cartridge manufacture, it is possible to suppress the occurrence of the reproducing error in a case where the information recorded on the thinned magnetic tape having the tape thickness of 5.3 µm or less is reproduced, and one aspect of the invention has been completed. The reason for using the 100th day from the date of magnetic tape cartridge manufacture as a reference day is because, in the magnetic tape cartridge of the related art, the deformation in which the tape width difference ($W_{inner}-W_{outer}$) becomes 4.1 µm or more does not occur 100 days from the date of magnetic tape cartridge manufacture.

However, the above description includes the inference of the present inventors. In addition, the following description includes the inference of the present inventors. The present invention is not limited to such inference. Hereinafter, the magnetic tape cartridge will be described.

Configuration of Magnetic Tape Cartridge

The above magnetic tape cartridge is a single reel type magnetic tape cartridge. In the single reel type magnetic tape cartridge, a magnetic tape is wound around a single reel. Regarding the configuration of the magnetic tape cartridge, a well-known technology regarding the single reel type magnetic tape cartridge can be applied.

Magnetic Tape

Tape Width Difference

In the magnetic tape included in the magnetic tape cartridge, the tape width difference ($W_{inner}-W_{outer}$) between a tape width $W_{inner}$ at a position of 50 m±1 m from a tape outer end and a tape width $W_{outer}$ at a position of 50 m±1 m from a tape inner end is 4.1 µm to 19.9 µm. The tape width $W_{inner}$ and the tape width $W_{outer}$ are values on 100th day from the date of magnetic tape cartridge manufacture.

Identification (ID) information items such as date of manufacture and the like are recorded on the magnetic tape cartridge, for product management. In the invention and the specification, the "date of magnetic tape cartridge manufacture" indicates the date of manufacture which is recorded on the magnetic tape cartridge. Such information is normally recorded on a radio frequency identifier (RFID) tag which is in the cartridge, and the date of manufacture (normally, date recorded as "Date of Manufacturer") can be recognized by reading the RFID tag. Regarding the magnetic tape cartridge in which the tape width difference ($W_{inner}-W_{outer}$) on 100th day from the date of magnetic tape cartridge manufacture is in the range described above, the recording of data on the magnetic tape accommodated in the magnetic tape cartridge and the reproducing of the recorded data may be performed on any day before the 100th day from the date of magnetic tape cartridge manufacture, may be performed on 100th day, or may be performed on any day after the 100th day. The magnetic tape cartridges having the same product lot number are normally manufactured by using the same raw material under the same manufacturing conditions, and thus, the tape width difference ($W_{inner}-W_{outer}$) on 100th day from the date of magnetic tape cartridge manufacture can be assumed to be the same values. The same applies to various physical properties described later such as a servo band interval difference.

A portion which is bonded to a region, where the recording and/or reproducing of data is performed, by bonding means using a splicing tape or the like is not considered as a portion of the magnetic tape of which various physical properties such as the tape width difference, the servo band interval difference are to be measured. For example, in order to draw and wind the magnetic tape from the magnetic tape cartridge, a leader tape may be bonded to a tape outer end of the magnetic tape. In such a case, the leader tape is not considered as a portion of the magnetic tape of which various physical properties such as the tape width difference, and the servo band interval difference are to be measured. Accordingly, in a case where the leader tape is bonded, the tape outer end of the magnetic tape is the end of the magnetic tape on a side to which the leader tape is bonded.

The tape outer end is a farthest end portion from the reel among both end portions of the magnetic tape wound around a reel, and a tape width $W_{outer}$ at a position of 50 m±1 m from the tape outer end represents a tape width of a portion which is significantly deformed, in a case where any countermeasures are taken, to have a narrower width compared to the initial stage due to a temporally strong tension. Meanwhile, the tape inner end is an end portion which is a starting point of the winding around the reel, and the tape width $W_{inner}$ at a position of 50 m±1 m from the tape inner end represents a tape width of a portion which is significantly deformed, in a case where any countermeasures are taken, to have a wider width compared to an initial stage due to a temporally strong compression.

The magnetic tape cartridge is manufactured by winding the magnetic tape obtained by slitting a long magnetic tape raw material to have a regulated width, around a reel and accommodating the magnetic tape in the magnetic tape cartridge. The regulated width is generally ½ inches (1 inch is 0.0254 meters) and the widths of the slit magnetic tape are equivalent widths at each position. Regarding the equivalent width, a manufacturing error which may normally occur in the slitting step is allowed. With respect to this, as described above, it is thought that deformations of the magnetic tape different depending on positions temporally occur from the recording to the reproducing. However, in the magnetic tape cartridge of the related art, the deformation in which the tape width difference ($W_{inner}-W_{outer}$) between the tape width $W_{inner}$ and the tape width $W_{outer}$ becomes 4.1 μm or more does not occur on 100th day from the date of magnetic tape cartridge manufacture. With respect to this, it is thought that, by causing the deformation in which the tape width difference ($W_{inner}-W_{outer}$) becomes 4.1 μm or more on 100th day from the date of magnetic tape cartridge manufacture to occur in advance, it is possible to suppress the occurrence of the reproducing error caused by the temporal occurrence of the deformation of the magnetic tape different depending on positions from the recording to the reproducing as described above. Meanwhile, in a case where a tape width difference between the inner portion and the outer portion of the magnetic tape before the data is recorded is excessively great, an error easily occurs at the time of the recording. With respect to this, in a case where the tape width difference ($W_{inner}-W_{outer}$) is 19.9 μm or less on 100th day from the date of magnetic tape cartridge manufacture, the recording of data may be easily performed over the total length of the magnetic tape accommodated in the magnetic tape cartridge. From the viewpoint of further suppressing the occurrence of the reproducing error, the tape width difference ($W_{inner}-W_{outer}$) is preferably 4.5 μm or more, more preferably 5.0 μm or more, and still more preferably 5.5 μm or more. On the other hand, from the viewpoint of further suppressing the occurrence of the recording error, the tape width difference preferably 19.5 ($W_{inner}-W_{outer}$) is μm or less, more preferably 19.0 μm or less, and still more preferably 18.5 μm or less.

The tape width difference is a value obtained by the following method. The following operation and measurement are performed in an environment of a temperature of 20° C. to 25° C. and relative humidity of 40% to 60%.

The magnetic tape wound around the reel is extracted from the magnetic tape cartridge on 100th day from the date of magnetic tape cartridge manufacture, and a tape sample having a length of 20 cm and including the position of 50 m±1 m from the tape outer end, and a tape sample having a length of 20 cm and including the position of 50 m±1 m from the tape inner end are cut out. The tape width of each tape sample is measured at the center in a longitudinal direction of the tape sample in a state of being sandwiched between plate-shaped members (for example, slide glass), in order to remove the effect of curl. The measurement of the tape width can be performed using a well-known measurement device capable of performing dimensional measurement with accuracy of 0.1 μm order. In addition, the measurement is performed within 20 minutes after the magnetic tape is extracted from the magnetic tape cartridge. In each tape sample, the tape width is respectively measured seven times (N=7), and an arithmetical mean of five measured values excluding the maximum value and the minimum value from the measured values obtained in the seven times of measurements is obtained. In a case where a total length of the magnetic tape accommodated in the magnetic tape cartridge is 950 m, the arithmetical mean obtained as described above is set as a tape width (tape width $W_{inner}$ or tape width $W_{outer}$) at each position. On the other hand, in a case where a total length of the magnetic tape accommodated in the magnetic tape cartridge is a length other than 950 m, a magnetic tape total length is set as L1 (unit:m), the arithmetical mean obtained as described above is set as W1, and W obtained by Equation: $W=(950/L1) \times W1$ is set as a tape width (tape width $W_{inner}$ or tape width $W_{outer}$) at each position. The tape width difference ($W_{inner}-W_{outer}$) can be controlled by performing heat treatment. The heat treatment will be described below in detail.

Tape Width Deformation Rate

In the magnetic tape in which the tape width difference ($W_{inner}-W_{outer}$) on 100th day from the date of magnetic tape cartridge manufacture is 4.1 μm to 19.9 μm as described above, a tape width deformation rate measured by the following method is preferably 400 ppm or less (parts per million), more preferably 390 ppm or less, still more preferably 380 ppm or less, still more preferably 370 ppm or less, still more preferably 360 ppm or less, and still more preferably 350 ppm or less. The tape width deformation rate can be, for example, 10 ppm or more, and can also be 100 ppm or more, 150 ppm or more, 200 ppm or more, or 250 ppm or more. It is thought that, as the tape width deformation rate is small, a dimensional change of the magnetic tape in the width direction from the recording to the reproducing of the data on the magnetic tape is small. Therefore, from a viewpoint of further suppressing the occurrence of the reproducing error caused by a change in the tape width from the recording to the reproducing, the magnetic tape width deformation rate is preferably small and may be 0 ppm. The tape width deformation rate can also be controlled by the heat treatment which will be described later in detail.

The tape width deformation rate is a value obtained by the following method. The following operation and measurement are performed in an environment of a temperature of 20° C. to 25° C. and relative humidity of 40% to 60%, except the storage described below.

The magnetic tape wound around the reel is extracted from the magnetic tape cartridge on 100th day from the date of magnetic tape cartridge manufacture, a tape sample having a length of 20 cm and including the position of 10 m±1 m from the tape outer end is cut out, and a tape width is obtained by the method described above. The tape width is set as a tape width before storage. The tape width before storage is a value obtained for a tape sample cut out from the same magnetic tape as the tape sample used for obtaining the tape width difference so as to include a position of 10 m±1 m from the tape outer end.

The tape sample having a length of 20 cm, of which the tape width before storage is obtained, is stored in a dry environment at a temperature of 52° C. for 24 hours, in a state where a load of 100 g is applied in a tape longitudinal direction, by holding one end portion of the tape sample and hanging a weight of 100 g on the other end portion. The dry environment is an environment having a relative humidity of 10% or less. The storage is started on 100th day from the date of magnetic tape cartridge manufacture. After the storage, a tape width (arithmetical mean of five measured values excluding the maximum value and the minimum value from the measured values obtained in the seven times of measurements) is obtained within 20 minutes after removing the load, in the same manner as in the method described above. The tape width is set as a tape width after storage.

A value obtained by dividing a difference of tape widths before and after storage (tape width before storage−tape width after storage) by the tape width before storage×10$^6$ (unit:ppm) is set as the tape width deformation rate.

Servo Band Interval Difference

The magnetic layer of the magnetic tape included in the magnetic tape cartridge has a plurality of servo bands. A region between two adjacent servo bands is a data band. An arrangement example of the servo bands and the data bands will be described below. In the magnetic tape, the difference ($G_{inner}$−$G_{outer}$) between the servo band interval $G_{inner}$ in a range of 49 m to 51 m from the tape inner end and the servo band interval $G_{outer}$ in a range of 49 m to 51 m from the tape outer end, that is the servo band interval difference is −3.9 μm to 0.0 μm as the value measured on 100th day from the date of magnetic tape cartridge manufacture. Hereinafter, this point will be further described.

The tape outer end is a farthest end portion from the reel among both end portions of the magnetic tape wound around a reel, and the servo band interval $G_{outer}$ in a range of 49 m to 51 m from the tape outer end represents a value of the servo band interval of a portion which is significantly deformed, in a case where any countermeasures are taken, to have a narrower width compared to the initial stage due to a temporally strong tension. The range of 49 m to 51 m from the tape outer end is a range from the position of 49 m from the tape outer end to the position of 51 m from the tape outer end. The tape inner end is an end portion which is a starting point of the winding around the reel, and the servo band interval $G_{inner}$ in a range of 49 m to 51 m from the tape inner end represents a value of the servo band interval of a portion which is significantly deformed, in a case where any countermeasures are taken, to have a narrower width compared to the initial stage due to a temporally strong compression. The range of 49 m to 51 m from the tape inner end is a range from the position of 49 m from the tape inner end to the position of 51 m from the tape inner end.

The tape width difference ($W_{inner}$−$W_{outer}$) can be controlled in a range of 4.1 μm to 19.9 μm as a value measured on 100th day from the date of magnetic tape cartridge manufacture by, for example, deforming the magnetic tape in advance so that the inner portion becomes wider than the outer portion by performing the heat treatment described below. For example, it is assumed that in a case where the servo pattern is already formed on the magnetic layer of the magnetic tape that is heat-treated so that the inner portion is wider than the outer portion, the servo band interval of the inner portion is increased than the outer portion along with the deformation of the magnetic tape during the heat treatment, and the servo band intervals of inner portion and the outer portion are significantly different from each other. For example, it can be considered that the difference between the servo band interval of the inner portion and the servo band interval of the outer portion as a value measured on 100th day from the date of magnetic tape cartridge manufacture is also a cause of occurrence of a reproducing error. On the other hand, for example, by adopting a means such as forming the servo pattern on the magnetic tape after performing the heat treatment to be described in detail later, the servo band interval difference ($G_{inner}$−$G_{outer}$) of the magnetic tape indicating the tape width difference ($W_{inner}$−$W_{outer}$) as the value measured on 100th day from the date of magnetic tape cartridge manufacture can be controlled in a range of −3.9 μm to 0.0 μm. It can also contribute to suppressing the occurrence of a reproducing error. The servo band interval difference ($G_{inner}$−$G_{outer}$) of 0.0 μm indicates that the servo band interval is the same between the inner portion and the outer portion. Also, a negative value of the servo band interval difference ($G_{inner}$−$G_{outer}$) means that the servo band interval of the inner portion is narrower than the servo band interval of the outer portion. This is opposite to the deformation after the temporal deformation of the magnetic tape described above (the inner portion is wider than the outer portion). It is assumed that in a case where the servo pattern is formed so that the servo band interval difference ($G_{inner}$−$G_{outer}$) is 0.0 μm or less as the value measured on 100th day from the date of magnetic tape cartridge manufacture, even in a case where the tape width of the inner portion of the magnetic tape becomes wider than the tape width of the outer portion from data recording to reproducing, the occurrence of the reproducing error due to the difference of the servo band interval between the inner portion and the outer portion during reproducing can be suppressed. From the viewpoint of further suppressing the occurrence of a reproducing error, the servo band interval difference ($G_{inner}$−$G_{outer}$) is preferably 0.0 μm in one aspect, and is also preferably −0.1 μm or less, −0.5 μm or less or −1.0 μm or less in one aspect. Also, in a case where the servo pattern is formed so that the servo band interval difference ($G_{inner}$−$G_{outer}$) is −3.9 μm or more as the value measured on 100th day from the date of magnetic tape cartridge manufacture, this can contribute to suppressing the occurrence of errors during recording. From the viewpoint of further suppressing the occurrence of errors during recording, the servo band interval difference ($G_{inner}$−$G_{outer}$) is preferably −3.5 μm or more, and more preferably −3.0 μm or more.

The servo band interval difference is obtained on 100th day from the date of magnetic tape cartridge manufacture as the difference ($G_{inner}$−$G_{outer}$) between the servo band interval $G_{inner}$ in a range of 49 m to 51 m from the tape inner end and the servo band interval $G_{outer}$ in a range of 49 m to 51 m from the tape outer end. The servo band interval difference is obtained in an environment where the temperature is 23° C.±1° C. and the relative humidity is 50%±5%. The servo band interval $G_{inner}$ is a value obtained in which in a range of 49 m to 51 m from the tape inner end, the interval between two servo bands adjacent to each other with the data band interposed therebetween is obtained for 1 longitudinal position (LPOS) word, and the arithmetical mean of the servo band intervals is obtained for entire range in the longitudinal direction in a range of 49 m to 51 m from the tape inner end and for all the LPOS words obtained for all the servo band intervals in a case where a plurality of servo band intervals are present. The servo band interval $G_{outer}$ is a value obtained in which in a range of 49 m to 51 m from the tape outer end, the interval between two servo bands adjacent to each other with the data band interposed therebetween is obtained for 1 LPOS word, and the arithmetical mean of the servo band intervals is obtained for entire range in the longitudinal direction in a range of 49 m to 51 m from the tape outer end and for all the LPOS words obtained for all the servo band intervals in a case where a plurality of servo band intervals are present. The interval between two servo bands adjacent to each other with the data band interposed therebetween can be obtained using a position error signal (PES) obtained from the servo signal acquired by reading the servo pattern by the servo signal reading element, for example. For details, the description of Example described below can be referred. The number of servo band intervals is the same as the number of data bands. Since the magnetic tape is usually provided with three or more servo bands, the number of servo band intervals is usually two or more. For example, in a magnetic tape having five servo bands, the number of adjacent servo band intervals across the data band is four. A method for manufacturing the magnetic tape having the servo band interval difference in the above range will be described below.

Tape Thickness

A thickness (a total thickness) of the magnetic tape is 5.3 µm or less. The thinning of the magnetic tape is preferable because it causes high capacity. However, in the magnetic tape thinned to have a thickness of 5.3 µm or less, deformations different depending on the inner portion and the outer portion tend to temporally occur in the magnetic tape cartridge as described above, in a case where there is no countermeasure, and the inventors have thought that this causes the occurrence of the reproducing error. On the other hand, in a case where the servo band interval difference is in the above range, even in a case where the above deformation occurs in the thinned magnetic tape having the tape thickness of 5.3 µm or less in the magnetic tape cartridge, the occurrence of a reproducing error can be suppressed. From a viewpoint of realizing higher capacity, the thickness of the magnetic tape is preferably 5.2 µm or less, more preferably 5.0 µm or less, and still more preferably 4.8 µm or less. In addition, from a viewpoint of ease of handling, the thickness of the magnetic tape is preferably 3.0 µm or more and more preferably 3.5 µm or more.

The tape thickness is a value obtained by the following method.

The magnetic tape wound around the reel is extracted from the magnetic tape cartridge on 100th day from the date of magnetic tape cartridge manufacture, 10 tape samples (for example, length of 5 to 10 cm) are cut out from a random portion of the magnetic tape, these tape samples are overlapped, and the thickness is measured. A value which is one tenth of the measured thickness (thickness per one tape sample) is set as the tape thickness. The thickness measurement can be performed using a well-known measurement device capable of performing the thickness measurement at 0.1 µm order. The tape thickness may be obtained by using the magnetic tape used for obtaining the tape width difference ($W_{inner}-W_{outer}$) and/or the tape width deformation rate, and may be obtained by using a magnetic tape cut out from the magnetic tape cartridge having the product lot number same as the magnetic tape cartridge, in which the magnetic tape used for obtaining the tape width difference ($W_{inner}-W_{outer}$) and/or the tape width deformation rate is accommodated.

In addition, various thicknesses such as the thickness of the magnetic layer can be obtained by the following method.

A cross section of the magnetic tape in the thickness direction is exposed with an ion beam and the observation of the exposed cross section is performed using a scanning electron microscope. Various thicknesses can be obtained as the arithmetical mean of the thicknesses obtained at two random portions in the cross section observation. Alternatively, various thicknesses can be obtained as a designed thickness calculated under the manufacturing conditions.

Hereinafter, the magnetic tape included in the magnetic tape cartridge will be described more specifically.

Non-Magnetic Support

The magnetic tape includes at least a non-magnetic support or a magnetic layer. Examples of the non-magnetic support (hereinafter, also simply referred to as a "support") include a polyethylene naphthalate support, a polyamide support, a polyethylene terephthalate support, and a polyamide imide support. These supports can be purchased as a commercially available product or can be manufactured by a well-known method. From hardness, flexibility, and the like, a polyethylene naphthalate support, a polyamide support, and a polyethylene terephthalate support are preferable as the support. The polyethylene naphthalate support means a support including at least a polyethylene naphthalate layer, and includes a support formed of a single or two or more layers of polyethylene naphthalate layers, and a support including one or more other layers in addition to the polyethylene naphthalate layer. This point is also the same for the other support. In addition, polyamide can have an aromatic skeleton and/or an aliphatic skeleton, and polyamide having an aromatic skeleton (aromatic polyamide) is preferable, and aramid is more preferable. The support can be biaxially stretched. Corona discharge, plasma treatment, easy-bonding treatment, or heat treatment may be performed with respect to these supports in advance.

Magnetic Layer

Ferromagnetic Powder

The magnetic layer contains the ferromagnetic powder. As the ferromagnetic powder contained in the magnetic layer, one or combination of two or more known ferromagnetic powders can be used as the ferromagnetic powder used in the magnetic layer of various magnetic recording media. It is preferable to use ferromagnetic powder having a small average particle size, from a viewpoint of improvement of recording density. From this point, the average particle size of the ferromagnetic powder is preferably 50 nm or less, more preferably 45 nm, still more preferably 40 nm, still more preferably 35 nm, still more preferably 30 nm, still more preferably 25 nm, and still more preferably 20 nm. On the other hand, from the viewpoint of magnetization stability, the average particle size of the ferromagnetic powder is preferably 5 nm or more, more preferably 8 nm or more, still more preferably 10 nm or more, still more preferably 15 nm or more, still more preferably 20 nm or more.

Hexagonal Ferrite Powder

As a preferred specific example of the ferromagnetic powder, the hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the present invention and the present specification, "hexagonal ferrite powder" refers to a ferromagnetic powder in which a hexagonal ferrite type crystal structure is detected as a main phase by X-ray diffraction analysis. The main phase refers to a structure to which the highest intensity diffraction peak belongs in an X-ray diffraction spectrum obtained by X-ray diffraction analysis. For example, in a case where the highest intensity diffraction peak in the X-ray diffraction spectrum obtained by X-ray diffraction analysis belongs to the hexagonal ferrite type crystal structure, it is determined that the hexagonal ferrite type crystal structure is detected as the main phase. In a case where only a single structure is detected by X-ray diffraction analysis, the detected structure is set as the main phase. The hexagonal ferrite type crystal structure contains at least an iron atom, a divalent metal atom, or an oxygen atom as constituent atoms. The divalent metal atom is a metal atom that may be a divalent cation as an ion, and examples thereof include alkaline earth metal atoms such as strontium atoms, barium atoms, and calcium atoms, and lead atoms. In the present invention and the present specification, the hexagonal strontium ferrite powder means that the main divalent metal atom contained in the powder is a strontium atom, and the hexagonal barium ferrite powder means that the main divalent metal atom contained in the powder is a barium atom. The main divalent metal atom means a divalent metal atom that occupies the largest amount in terms of atomic % among divalent metal atoms contained in the powder. However, the divalent metal atom does not include a rare earth atom. The "rare earth atom" in the present invention and the present specification is selected from the group consisting of a scandium atom (Sc), an yttrium atom (Y), and a lanthanoid atom. Lanthanoid atoms is selected from the group consisting of lanthanum atoms (La), cerium atoms (Ce), praseodymium atoms (Pr), neodymium atoms (Nd), promethium atoms (Pm), samarium atoms (Sm), europium atoms (Eu), gadolinium atoms (Gd), terbium atoms (Tb), dysprosium atoms (Dy), holmium atoms (Ho), erbium atoms (Er), thulium atoms (Tm), ytterbium atoms (Yb), and lutetium atoms (Lu).

Hereinafter, the hexagonal strontium ferrite powder which is one aspect of the hexagonal ferrite powder will be described in more detail.

The activation volume of the hexagonal strontium ferrite powder is preferably in the range of 800 to 1500 $nm^3$. The micronized hexagonal strontium ferrite powder having an activation volume in the above range is suitable for producing the magnetic tape exhibiting excellent electromagnetic conversion characteristics. The activation volume of the hexagonal strontium ferrite powder is preferably 800 $nm^3$ or more, and can be, for example, 850 $nm^3$ or more. From the viewpoint of further improving the electromagnetic conversion characteristics, the activation volume of the hexagonal strontium ferrite powder is more preferably 1400 $nm^3$ or less, still more preferably 1300 $nm^3$ or less, still more preferably 1200 $nm^3$ or less, still more preferably 1100 $nm^3$ or less.

"Activation volume" is a unit of magnetization reversal and is an index indicating the magnetic size of particles. The activation volume described in the present invention and the present specification and the anisotropy constant Ku described below are values measured at a magnetic field sweep rate of 3 minutes and 30 minutes of the coercivity Hc measurement unit using a vibrating sample magnetometer (the measurement temperature: 23° C.±1° C.), and obtained from the following relational expression between Hc and the activation volume V. Note that the unit of the anisotropy constant Ku is 1 erg/cc=$1.0 \times 10^{-1}$ $J/m^3$.

$$Hc = 2Ku/Ms\{1-[(kT/KuV)ln(At/0.693)]^{1/2}\}$$

[in the above expression, Ku: anisotropy constant (unit: $J/m^3$), Ms: saturation magnetization (unit: kA/m), k: Boltzmann constant, T: absolute temperature (unit: K), V: activation Volume (unit: $cm^3$), A: spin precession frequency (unit: $s^{-1}$), t: magnetic field inversion time (unit: s)]

An anisotropy constant Ku can be used as an index for reducing thermal fluctuation, in other words, improving thermal stability. The hexagonal strontium ferrite powder can preferably have a Ku of $1.8 \times 10^5$ $J/m^3$ or more, more preferably a Ku of $2.0 \times 10^5$ $J/m^3$ or more. The Ku of the hexagonal strontium ferrite powder can be, for example, $2.5 \times 10^5$ $J/m^3$ or less.

However, higher Ku is preferable since it refers to higher thermal stability, and is not limited to the values exemplified above.

The hexagonal strontium ferrite powder may or may not contain rare earth atoms. In a case where the hexagonal strontium ferrite powder contains rare earth atoms, it preferable to contain rare earth atoms at a content (the bulk content) of 0.5 to 5.0 atomic % with respect to 100 atomic % of iron atoms. In one aspect, the hexagonal strontium ferrite powder containing rare earth atoms can have a rare earth atom surface layer uneven distribution property. In the present invention and the present specification, "rare earth atom surface layer uneven distribution property" means that a rare earth atom content (hereinafter, referred to as a "rare earth atom surface layer content" or simply a "surface layer content" regarding to the rare earth atom") with respect to 100 atomic % of the iron atoms in a solution obtained by partially dissolving the hexagonal strontium ferrite powder by an acid satisfies the rare earth atom content (hereinafter, referred to as the "rare earth atom bulk content" or simply the "bulk content" regarding to the rare earth atom) with respect to 100 atomic % of the iron atoms in the solution obtained by completely dissolving the hexagonal strontium ferrite powder by an acid, and a ratio of the rare earth atom surface layer content/the rare earth atom bulk content>1.0. The rare earth atom content of hexagonal strontium ferrite powder described later is synonymous with the rare earth atom bulk content. On the other hand, since the partial dissolution using an acid dissolves the surface layer of the particles constituting the hexagonal strontium ferrite powder, the rare earth atom content in the solution obtained by partial dissolution refers to the rare earth atom content in surface layer of the particles constituting the hexagonal strontium ferrite powder. The fact that the rare earth atom surface layer content satisfies the ratio of "rare earth atom surface layer content/rare earth atom bulk content>1.0" means that the rare earth atoms are unevenly distributed (that is, present more than inside) on the surface layer in the particles constituting the hexagonal strontium ferrite powder. In the present invention and the present specification, the surface layer means a partial region from the surface of the particles constituting the hexagonal strontium ferrite powder toward the inside.

In a case where the hexagonal strontium ferrite powder contains rare earth atoms, it preferable that the rare earth atom content (the bulk content) is in a range of 0.5 to 5.0 atomic % with respect to 100 atomic % of iron atoms. It is considered that the presence of the rare earth atoms in the above described bulk content and the uneven distribution of the rare earth atoms on the surface layer of the particles constituting the hexagonal strontium ferrite powder contribute to suppressing the decrease in the reproduction output in the repeated reproduction. This is because the hexagonal strontium ferrite powder contains rare earth atoms with the bulk content in the above range, and the rare earth atoms are unevenly distributed in the surface layer of the particles constituting the hexagonal strontium ferrite powder, as a result, the anisotropy constant Ku is improved. The higher value of the anisotropy constant Ku can further suppress the phenomenon called so-called thermal fluctuation (in other words, the thermal stability can be improved). By suppressing the occurrence of thermal fluctuation, it is possible to suppress a decrease in reproduction output in repeated reproduction. The uneven distribution of rare earth atoms in the surface layer of the hexagonal strontium ferrite powder contributes to stabilizing the spin of the iron (Fe) site in the crystal lattice of the surface layer, and thereby the anisotropy constant Ku may increase.

In addition, it is assumed that the use of the hexagonal strontium ferrite powder having a rare earth atom surface layer uneven distribution property as the ferromagnetic powder in the magnetic layer also contributes to suppressing the scraping of the magnetic layer surface due to sliding with the magnetic head. Stated another way, it is assumed that the hexagonal strontium ferrite powder having rare earth atom surface layer uneven distribution property can also contribute to improving the running durability of the magnetic tape. This is because the uneven distribution of the rare earth atoms on the surface of the particles constituting the hexagonal strontium ferrite powder contributes to improving the interaction between the particle surface and the organic substance (for example, binder and/or additive) contained in the magnetic layer, as a result, the strength of the magnetic layer is improved.

From the viewpoint of further suppressing the reduction in reproduction output during repeated reproduction and/or further improving the running durability, the rare earth atom content (the bulk content) is more preferably in the range of 0.5 to 4.5 atomic %, still more preferably in the range of 1.0 to 4.5 atomic %, and further preferably in the range of 1.5 to 4.5 atomic %.

The bulk content is a content obtained by completely dissolving the hexagonal strontium ferrite powder. In the present invention and the present specification, unless otherwise noted, the content of atoms refers to a bulk content obtained by completely dissolving the hexagonal strontium ferrite powder. The hexagonal strontium ferrite powder containing rare earth atoms may contain only one kind of rare earth atom as the rare earth atom, or may contain two or more kinds of rare earth atoms. The bulk content in a case where two or more kinds of rare earth atoms are contained is obtained for the sum of two or more kinds of rare earth atoms. This also applies to other components in the present invention and the present specification. Unless otherwise noted, certain component may be used along, or two or more components may be used. The content in a case where two or more components are used is for the sum of two or more components.

In a case where the hexagonal strontium ferrite powder contains the rare earth atom, the contained rare earth atom need only be one or more kinds of the rare earth atoms. From the viewpoint of further suppressing the decrease in the reproduction output in repeated reproduction, the example of a preferable rare earth atom include neodymium atoms, samarium atoms, yttrium atoms, and dysprosium atoms, neodymium atoms, samarium atoms, and yttrium atoms are more preferable, and neodymium atoms is still more preferable.

In the hexagonal strontium ferrite powder having a rare earth atom surface layer uneven distribution property, the rare earth atoms need only be unevenly distributed in the surface layer of the particles constituting the hexagonal strontium ferrite powder, and the degree of uneven distribution is not limited. For example, for the hexagonal strontium ferrite powder having rare earth atom surface layer uneven distribution property, the ratio "surface layer content/bulk content" of the rare earth atom surface layer content obtained by partial dissolution under the dissolution conditions described below to the rare earth atoms bulk content obtained by completely dissolution under the dissolution conditions described below is more than 1.0, and can be 1.5 or more. The fact that "surface layer content/bulk content" is more than 1.0 means that the rare earth atoms are unevenly distributed (that is, present more than inside) on the surface layer in the particles constituting the hexagonal strontium ferrite powder. Further, the ratio "surface layer content/bulk content" of the rare earth atom surface layer content obtained by partial dissolution under the dissolution conditions described later to the bulk content of the rare earth atoms obtained by complete dissolution under the dissolution conditions described later can be, for example, 10.0 or less, 9.0 or less, 8.0 or less, 7.0 or less, 6.0 or less, 5.0 or less, or 4.0 or less. However, in the hexagonal strontium ferrite powder having a rare earth atom surface layer uneven distribution property, the rare earth atoms need only be unevenly distributed in the surface layer of the particles constituting the hexagonal strontium ferrite powder, and "surface layer content/bulk content" described above is not limited to the exemplified upper limit and lower limit.

The partial dissolution and complete dissolution of the hexagonal strontium ferrite powder will be described below. For the hexagonal strontium ferrite powder that exists as a powder, the partially and completely dissolved sample powder is taken from the same lot of powder. On the other hand, as for the hexagonal strontium ferrite powder contained in the magnetic layer of the magnetic tape, a part of the hexagonal strontium ferrite powder extracted from the magnetic layer is subjected to partial dissolution, and other parts are subjected to complete dissolution. The hexagonal strontium ferrite powder can be extracted from the magnetic layer by, for example, the method described in paragraph 0032 of JP2015-091747A.

The partial dissolution means that the hexagonal strontium ferrite powder is dissolved so that the residue of the hexagonal strontium ferrite powder can be visually confirmed in the solution at the end of dissolution. For example, by partial dissolution, it is possible to dissolve a region of 10 to 20% by mass of the particles constituting the hexagonal strontium ferrite powder with 100% by mass as a whole. Meanwhile, complete dissolution means that the hexagonal strontium ferrite powder is dissolved so that the residue of the hexagonal strontium ferrite powder cannot be visually confirmed in the solution at the end of dissolution. The partial dissolution and measurement of the surface layer content are performed, for example, by the following method. However, the following dissolution conditions such as the amount of sample powder are the examples, and any dissolution conditions capable of partial dissolution and complete dissolution can be employed.

A container (for example, a beaker) containing 12 mg of sample powder and 10 mL of 1 mol/L hydrochloric acid is held on a hot plate at a set temperature of 70° C. for 1 hour. The resulting solution is filtered through a 0.1 µm membrane filter. The elemental analysis of the obtained filtrate is performed by an inductively coupled plasma (ICP) analyzer. In this way, the rare earth atom surface layer content relative to 100 atomic % of iron atoms can be obtained. In a case where a plurality of types of the rare earth atoms are detected by elemental analysis, the total content of all rare earth atoms is defined as the surface layer content. This also applies to the measurement of the bulk content.

On the other hand, the measurement of the complete dissolution and the bulk content is performed, for example, by the following method. A container (for example, a beaker) containing 12 mg of sample powder and 10 mL of 4 mol/L hydrochloric acid is held on a hot plate at a set temperature of 80° C. for 3 hour. Thereafter, it is carried out in the same manner as the above partial dissolution and measurement of the surface layer content, and the bulk content relative to 100 atomic % of iron atoms can be obtained.

From the viewpoint of increasing the reproduction output in a case of reproducing the information recorded on the magnetic tape, it is desirable that the mass magnetization σs of the ferromagnetic powder contained in the magnetic tape is high. In this regard, the hexagonal strontium ferrite powder containing rare earth atoms but not having the rare earth atom surface layer uneven distribution property tends to have a large decrease in σs as compared with the hexagonal strontium ferrite powder containing no rare earth atoms. On the other hand, it is considered that the hexagonal strontium ferrite powder having a rare earth atom surface layer uneven distribution property is preferable in suppressing such a large decrease in σs. In one aspect, σs of the hexagonal strontium ferrite powder can be 45 A·m$^2$/kg or more, and can be 47 A·m$^2$/kg or more. On the other hand, σS is preferably 80 A·m$^2$/kg or less and more preferably 60 A·m$^2$/kg or less from the viewpoint of noise reduction. σs can be measured using a known measuring device capable of measuring magnetic properties such as a vibrating sample magnetometer. In the present invention and the present specification, unless otherwise noted, the mass magnetization σs is a value measured at a magnetic field strength of 1194 kA/m (15 kOe).

Regarding the content (the bulk content) of the constituent atoms of the hexagonal strontium ferrite powder, the strontium atom content can be in the range of, for example, 2.0 to 15.0 atomic % with respect to 100 atomic % of iron atoms. In one aspect, in the hexagonal strontium ferrite powder, the divalent metal atom contained in the powder may be only strontium atoms. In another aspect, the hexagonal strontium ferrite powder may contain one or more other divalent metal atoms in addition to the strontium atoms. For example, it can contain barium atoms and/or calcium atoms. In a case where other divalent metal atoms other than strontium atoms are contained, the barium atom content and calcium atom content in the hexagonal strontium ferrite powder are, for example, 0.05 to 5.0 atomic % with respect to 100 atomic % of iron atoms, respectively.

As crystal structures of hexagonal ferrite, magnetoplumbite type (also called "M type"), W type, Y type and Z type are known. The hexagonal strontium ferrite powder may have any crystal structure. The crystal structure can be confirmed by X-ray diffraction analysis. The hexagonal strontium ferrite powder can have a single crystal structure or two or more crystal structures detected by X-ray diffraction analysis. For example, in one aspect, the hexagonal strontium ferrite powder can have only the M type crystal structure detected by X-ray diffraction analysis. For example, the M type hexagonal ferrite is represented by a composition formula of $AFe_{12}O_{19}$. Here, A represents a divalent metal atom, and in a case where the hexagonal strontium ferrite powder is M type, A is only strontium atom (Sr), or in a case where a plurality of divalent metal atoms are contained as A, as described above, strontium atoms (Sr) occupy the most on an atomic % basis. The divalent metal atom content of the hexagonal strontium ferrite powder is usually determined by the type of crystal structure of the hexagonal ferrite and is not particularly limited. The same applies to the iron atom content and oxygen atom content. The hexagonal strontium ferrite powder contains at least iron atoms, strontium atoms, or oxygen atoms, and may further contain rare earth atoms. Furthermore, the hexagonal strontium ferrite powder may or may not contain atoms other than these atoms. As an example, the hexagonal strontium ferrite powder may contain aluminum atoms (Al). The content of aluminum atoms can be, for example, 0.5 to 10.0 atomic % with respect to 100 atomic % of iron atoms. From the viewpoint of further suppressing the reduction in reproduction output in repeated reproduction, the hexagonal strontium ferrite powder contains iron atoms, strontium atoms, oxygen atoms and rare earth atoms, and the content of atoms other than these atoms is preferably 10.0 atomic % or less, more preferably in a range of 0 to 5.0 atomic %, and may be 0 atomic %, with respect to 100 atomic % of iron atoms. That is, in one aspect, the hexagonal strontium ferrite powder may not contain atoms other than iron atoms, strontium atoms, oxygen atoms, and rare earth atoms. The above-mentioned content represented in atomic % is obtained by converting the content (unit: mass %) of each atom obtained by completely dissolving the hexagonal strontium ferrite powder to the value represented by atomic % using the atomic weight of each atom. Further, in the present invention and the present specification, "does not contain" for a certain atom means that the content rate is 0% by mass in a case of being completely dissolved and measured by an ICP analyzer. The detection limit of the ICP analyzer is usually 0.01 ppm (part per million) or less on a mass basis. The term "does not include" is used in the sense of including that it is included in an amount less than the detection limit of the ICP analyzer. In one aspect, the hexagonal strontium ferrite powder does not contain bismuth atoms (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, the ε-iron oxide powder can also be used. In the present invention and the present specification, "ε-iron oxide powder" refers to a ferromagnetic powder in which a ε-iron oxide type crystal structure is detected as a main phase by X-ray diffraction analysis. For example, in a case where the highest intensity diffraction peak in the X-ray diffraction spectrum obtained by X-ray diffraction analysis belongs to the ε-iron oxide type crystal structure, it is determined that the ε-iron oxide type crystal structure is detected as the main phase. As a method for producing the ε-iron oxide powder, a method of producing from goethite, a reverse micelle method, and the like are known. All of the above producing methods are known. Also, for a method of producing ε-iron oxide powder in which a part of Fe is substituted by a substituted atom such as Ga, Co, Ti, Al, Rh, and the like, reference may be made to, for example, J. Org. Jpn. Soc. Powder Metallurgy Vol. 61 Supplement, No. 51, pp. S280-5284, J. M. Mater. Chem. C, 2013, 1, pp. 5200-5206. However, the method for producing ε-iron oxide powder that can be used as the ferromagnetic powder in the magnetic layer of the magnetic tape is not limited to the method described here.

The activation volume of the ε-iron oxide powder is preferably in the range of 300 to 1500 nm$^3$. The micronized ε-iron oxide powder having an activation volume in the above range is suitable for producing the magnetic tape exhibiting excellent electromagnetic conversion characteristics. The activation volume of the ε-iron oxide powder is preferably 300 nm$^3$ or more, and can be, for example, 500 nm$^3$ or more. From the viewpoint of further improving the electromagnetic conversion characteristics, the activation volume of the ε-iron oxide powder is more preferably 1400 nm$^3$ or less, still more preferably 1300 nm$^3$ or less, still more preferably 1200 nm$^3$ or less, still more preferably 1100 nm$^3$ or less.

An anisotropy constant Ku can be used as an index for reducing thermal fluctuation, in other words, improving thermal stability. The ε-iron oxide powder can preferably have a Ku of $3.0 \times 10^4$ J/m$^3$ or more, more preferably a Ku of $8.0 \times 10^4$ J/m$^3$ or more. Further, Ku of the ε-iron oxide powder can be, for example, $3.0 \times 10^5$ J/m$^3$ or less. However, higher Ku is preferable since it refers to higher thermal stability, and is not limited to the values exemplified above.

From the viewpoint of increasing the reproduction output in a case of reproducing the information recorded on the magnetic tape, it is desirable that the mass magnetization σs of the ferromagnetic powder contained in the magnetic tape is high. In one aspect, σs of the ε-iron oxide powder can be 8 A·m²/kg or more, and can be 12 A·m²/kg or more. On the other hand, σs of the ε-iron oxide powder is preferably 40 A·m²/kg or less and more preferably 35 A·m²/kg or less from the viewpoint of noise reduction.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on photographic printing paper so that the total magnification of 500,000 or is displayed on the display, to obtain an image of particles configuring the powder.

A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (a particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (a filling percentage) of the ferromagnetic powder of the magnetic layer is preferably 50% to 90% by mass and more preferably 60% to 90% by mass. The magnetic layer contains the ferromagnetic powder, can contain a binder, and can optionally contain one or more additional additives. A high filling percentage of the ferromagnetic powder in the magnetic layer is preferable from a viewpoint of improvement of recording density.

Binder, Curing Agent

The magnetic tape can be a coated magnetic tape, and the magnetic layer can contain the binder. The binding agent is one or more kinds of resin. As the binding agent, various resins normally used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later. For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The content of the curing agent of the magnetic layer forming composition can be, for example, 0 to 80.0 parts by mass with respect to 100.0 parts by mass of the binding agent, and can be 50.0 to 80.0 parts by mass, from a viewpoint of improvement of hardness of the magnetic layer.

Additive

The magnetic layer may contain one or more additives as required. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. For example, for the lubricant, descriptions disclosed in paragraphs 0030 to 0033, 0035, and 0036 of JP2016-126817A can be referred to. The lubricant may be included in the non-magnetic layer which will be described later. For the lubricant which may be included in the non-magnetic layer, descriptions disclosed in paragraphs 0030, 0031, 0034, 0035, and 0036 of JP2016-126817A can be referred to. For the dispersing agent, descriptions disclosed in paragraphs 0061 and 0071 of JP2012-133837A can be referred to. The dispersing agent may be added to a non-magnetic layer forming composition. For the dispersing agent which may be added to the non-magnetic layer forming composition, a description disclosed in a paragraph 0061 of JP2012-133837A can be referred to. As the non-magnetic powder which may be included in the magnetic layer, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, a commercially available product can be suitably selected according to the desired properties or manufactured by a well-known method, and can be used with any amount. As an example of the additive which can be used for improving dispersibility of the abrasive in the magnetic layer including the abrasive, a dispersing agent disclosed in paragraphs 0012 to 0022 of JP2013-131285A can be used.

The magnetic layer described above can be provided on the surface of the non-magnetic support directly or indirectly through the non-magnetic layer.

Non-Magnetic Layer

Next, the non-magnetic layer will be described. The magnetic tape may include a magnetic layer directly on the surface of the non-magnetic support or may include a magnetic layer on the surface of the non-magnetic support directly or indirectly through the non-magnetic layer including the non-magnetic powder. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

The non-magnetic layer can be the layer containing a non-magnetic powder and the binder, and can further contain one or more additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density of 10 mT or less, a layer having coercivity of 100 Oe or less, or a layer having a residual magnetic flux density of 10 mT or less and coercivity of 100 Oe or less. 1 [kOe]=$10^6/4\pi$ [A/m] is satisfied. It is preferable that the non-magnetic layer does not have a residual magnetic flux density and coercivity.

Back Coating Layer

The magnetic tape can also include a back coating layer including a non-magnetic powder on a surface side of the non-magnetic support opposite to the surface side provided with the magnetic layer. The back coating layer preferably includes any one or both of carbon black and inorganic powder. The back coating layer can be the layer containing a non-magnetic powder and the binder, and can further contain one or more additives. For the binding agent in the back coating layer and various additives which can be randomly included therein, a well-known technology regarding the back coating layer can be applied, and a well-known technology regarding the process of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774 can be referred to.

Various Thicknesses

The thickness (total thickness) of the magnetic tape is as described above.

A thickness of the non-magnetic support is preferably 3.0 to 5.0 µm.

A thickness of the magnetic layer can be optimized according to a saturation magnetization amount of a magnetic head used, a head gap length, a recording signal band, and the like, is normally 0.01 µm to 0.15 µm, and is preferably 0.02 µm to 0.12 µm and more preferably 0.03 µm to 0.1 µm, from a viewpoint of realization of high-density recording. The magnetic layer need only be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 µm and is preferably 0.1 to 1.0 µm.

A thickness of the back coating layer is preferably 0.9 µm or less and more preferably 0.1 to 0.7 µm.

Manufacturing Step

Manufacturing Step of Magnetic Tape forming Servo Pattern

Steps of preparing the composition for forming the magnetic layer, the non-magnetic layer, or the back coating layer generally include at least a kneading step, a dispersing step, or a mixing step provided before and after these steps, if necessary. Each step may be divided into two or more stages. The components used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, the binding agent may be separately added in the kneading step, the dispersing step, and a mixing step for adjusting a viscosity after the dispersion. In order to manufacture the magnetic tape, a well-known manufacturing technology can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. As a disperser, a well-known disperser can be used. The filtering may be performed by a well-known method in any stage for preparing each layer forming composition. The filtering can be performed by using a filter, for example. As the filter used in the filtering, a filter having a hole diameter of 0.01 to 3 µm (for example, filter made of glass fiber or filter made of polypropylene) can be used, for example.

The magnetic layer can be formed by directly applying the magnetic layer forming composition onto the surface of the non-magnetic support or performing multilayer coating with the non-magnetic layer forming composition in order or at the same time. The back coating layer can be formed by directly applying the back coating layer forming composition onto the surface of the non-magnetic support opposite to the surface provided with the non-magnetic layer and/or the magnetic layer (or non-magnetic layer and/or the magnetic layer is to be provided). For the details of the coating for forming each layer, a description disclosed in a paragraph 0066 of JP2010-231843A can be referred to.

For various other steps for manufacturing the magnetic tape, a well-known technology can be applied. For details of the various steps, descriptions disclosed in paragraphs 0067 to 0070 of JP2010-231843A can be referred to, for example. In the embodiment in which the alignment process is performed, the alignment process is performed on the coating layer in the alignment zone while the coating layer of the magnetic layer forming composition is in a wet state. For the alignment process, various well-known technologies such as a description disclosed in a paragraph 0052 of JP2010-024113A can be used. For example, the vertical alignment process can be performed by a known method such as a method using a different-polar counter magnet. In the alignment zone, the drying speed of the coating layer can be controlled by the temperature of the drying air, the air volume and/or the conveyance speed in the alignment zone. Further, the coating layer may be pre-dried before being conveyed to the alignment zone.

Through various steps, a long magnetic tape raw material can be obtained. The obtained magnetic tape raw material is cut (slit) by a well-known cutter to have a magnetic tape to be wound and mounted on the magnetic tape cartridge. The width is determined according to the regulation and is normally ½ inches.

As described above, by causing the deformation which may temporally occur in the magnetic tape cartridge from the recording to the reproducing, to occur in advance, it is possible to control the tape width difference ($W_{inner}-W_{outer}$) in the range described above. For this, the magnetic tape cut to have the width described above is preferably wound around a core member and is subjected to the heat treatment in the wound state. By this heat treatment, it is possible to cause the deformation which may temporally occur in the magnetic tape wound around the reel in the magnetic tape cartridge from the recording to the reproducing, to occur in advance. For the reasons described above, the servo pattern is preferably formed after the heat treatment in order to control the servo band interval difference within the above range.

In one aspect, the heat treatment is performed in a state where the magnetic tape is wound around the core member for heat treatment (hereinafter, referred to as a "core for heat treatment"), the magnetic tape after the heat treatment is wound around a reel of the magnetic tape cartridge after the servo pattern is formed, and a magnetic tape cartridge in which the magnetic tape is wound around the reel can be manufactured.

The core for heat treatment can be formed of metal, a resin, or paper. The material of the core for heat treatment is preferably a material having high rigidity, from a viewpoint of suppressing the occurrence of a winding defect such as spoking or the like. From this viewpoint, the core for heat treatment is preferably formed of metal or a resin. In addition, as an index for rigidity, a modulus of bending elasticity of the material for the core for heat treatment is preferably 0.2 GPa or more and more preferably 0.3 GPa or more. Meanwhile, since the material having high rigidity is normally expensive, the use of the core for heat treatment of the material having rigidity exceeding the rigidity capable of suppressing the occurrence of the winding defect causes the cost increase. By considering the viewpoint described above, the modulus of bending elasticity of the material for the core for heat treatment is preferably 250 GPa or less. The modulus of bending elasticity is a value measured based on international organization for standardization (ISO) 178 and the modulus of bending elasticity of various materials is well known. In addition, the core for heat treatment can be a solid or hollow core member. In a case of a hollow state, a wall thickness is preferably 2 mm or more, from a viewpoint of maintaining the rigidity. In addition, the core for heat treatment may include or may not include a flange.

The magnetic tape having a length equal to or more than a length to be finally accommodated in the magnetic tape cartridge (hereinafter, referred to as a "final product length") is prepared as the magnetic tape wound around the core for heat treatment, and it is preferable to perform the heat treatment by placing the magnetic tape in the heat treatment environment, in a state where the magnetic tape is wound around the core for heat treatment. The magnetic tape length wound around the core for heat treatment is equal to or greater than the final product length, and is preferably the "final product length+α", from a viewpoint of ease of winding around the core for heat treatment. α is preferably equal to or greater than 5 m, from a viewpoint of ease of the winding. The tension in a case of winding around the core for heat treatment is preferably 0.1 N (newton) or more, from viewpoints of ease of the winding, ease of adjusting the tape width difference ($W_{inner}-W_{outer}$) by heat treatment, and manufacturing suitability. In addition, from a viewpoint of preventing the occurrence of excessive deformation, the tension in a case of winding around the core for heat treatment is preferably 1.5 N or less and more preferably 1.0 N or less. An outer diameter of the core for heat treatment is preferably 20 mm or more and more preferably 40 mm or more, from viewpoints of ease of the winding and suppressing coiling (curl in longitudinal direction). On the other hand, from the viewpoint of ease of adjusting the tape width difference ($W_{inner}-W_{outer}$) within the above range, the outer diameter of the heat treatment core is preferably 100 mm or less, and more preferably 90 mm or less. A width of the core for heat treatment may be equal to or more than the width of the magnetic tape wound around the core. In addition, after the heat treatment, in a case of detaching the magnetic tape from the core for heat treatment, it is preferable that the magnetic tape and the core for heat treatment are sufficiently cooled and magnetic tape is detached from the core for heat treatment, in order to suppress the occurrence of the tape deformation which is not intended during the detaching operation. It is preferable that after the servo pattern is formed, the detached magnetic tape is wound around another core temporarily (referred to as a "core for temporary winding"), and is wound around a reel (generally, outer diameter is appropriately 40 to 50 mm) of the magnetic tape cartridge. Accordingly, a relationship between the inside and the outside with respect to the core for heat treatment of the magnetic tape in a case of the heat treatment can be maintained and the magnetic tape can be wound around the reel of the magnetic tape cartridge. Regarding the details of the core for temporary winding and the tension in a case of winding the magnetic tape around the core, the description described above regarding the core for heat treatment can be referred to. In an aspect in which the heat treatment is subjected to the magnetic tape having a length of the "final product length+α", the length corresponding to "+α" may be extracted in any stage. For example, in one aspect, the magnetic tape having the final product length may be wound around the reel of the magnetic tape cartridge from the core for temporary winding and the remaining length corresponding the "+α" may be extracted. From a viewpoint of decreasing the amount of the portion to be cut out and removed, a is preferably 20 m or less.

The specific aspect of the heat treatment performed in a state of being wound around the core member as described above is described below.

An atmosphere temperature for performing the heat treatment (hereinafter, referred to as "heat treatment temperature") is preferably 40° C. or higher and more preferably 50° C. or higher. On the other hand, from a viewpoint of suppressing the excessive deformation, the heat treatment temperature is preferably 75° C. or lower, more preferably 70° C. or lower, and even more preferably 65° C. or lower.

A weight absolute humidity of the atmosphere for performing the heat treatment is preferably 0.1 g/kg Dry air or more and more preferably 1 g/kg Dry air or more. The atmosphere in which the weight absolute humidity is in the range described above is preferable, because it can be prepared without using a special device for decreasing moisture. On the other hand, the weight absolute humidity is preferably 70 g/kg Dry air or less and more preferably 66 g/kg Dry air or less, from a viewpoint of suppressing a deterioration in workability. The heat treatment time is preferably 0.3 hours or longer and more preferably 0.5 hours or longer. In addition, the heat treatment time s preferably 48 hours or shorter, from a viewpoint of production efficiency.

By performing the heat treatment as described above, the tape width difference ($W_{inner}-W_{outer}$) can be controlled in the range of 4.1 μm to 19.9 μm as the value on the 100th day from the date of magnetic tape cartridge manufacture. The tape width of the magnetic tape subjected to the heat treatment generally becomes wider from the tape outer end towards the inner end. Therefore, in a case where the tape width is measured for a tape sample obtained from an any position between the measurement position of the tape width $W_{outer}$ and the measurement position of the tape width $W_{inner}$, the value on the 100th day from the date of magnetic tape cartridge manufacture is normally the value exceeding the tape width $W_{outer}$ and less than the tape width $W_{inner}$, and the tape sample, which is closer to the measurement position of the tape width $W_{inner}$, normally has a wider tape width.

Formation of Servo Pattern

A servo pattern is formed on the magnetic tape manufactured as described above, preferably after the heat treatment. The "formation of the servo pattern" can also be referred to as "servo signal recording". Hereinafter, the formation of the servo pattern will be described.

The servo pattern is usually formed along the longitudinal direction of the magnetic tape.

Examples of control (servo control) methods using servo signals include timing-based servo (TBS), amplitude servo, and frequency servo.

As shown in European Computer Manufacturers Association (ECMA)-319 (June, 2001), a magnetic tape conforming to the linear tape-open (LTO) standard (generally called "LTO tape") employs a timing-based servo method. In the timing-based servo method, the servo pattern is usually configured by arranging a plurality of a pair of non-parallel magnetic stripes (also referred to as "servo stripes") continuously in the longitudinal direction of the magnetic tape. In the present invention and the present specification, a "timing-based servo pattern" refers to a servo pattern that enables head tracking in a timing-based servo method servo system. As described above, the reason why the servo pattern is configured by a pair of non-parallel magnetic stripes is to teach the passing position to the servo signal reading element passing over the servo pattern. Specifically, the pair of magnetic stripes is formed so that the interval thereof continuously changes along the width direction of the magnetic tape, and the servo signal reading element reads the interval to recognize the relative position of the servo pattern and the servo signal reading element. The information on the relative position enables tracking of the data track. Therefore, a plurality of servo tracks are usually set on the servo pattern along the width direction of the magnetic tape.

The servo band is configured with the servo patterns that are continuous in the longitudinal direction of the magnetic tape. Normally, a plurality of the servo bands are provided in the magnetic tape. For example, in the LTO tape, the number of the servo bands is 5. A region interposed between two adjacent servo bands is a data band. The data band is configured with a plurality of the data tracks, and each data track corresponds to each servo track.

In one aspect, as shown in JP2004-318983A, the information indicating a servo band number (also referred to as "servo band identification (ID)" or "unique data band identification method (UDIM) information") is embedded in each servo band. The servo band ID is recorded by shifting a specific servo stripe of a plurality of a pair of servo stripes in the servo band so that the position thereof is relatively displaced in the longitudinal direction of the magnetic tape. Specifically, the shifting method of a specific stripe of a plurality of a pair of servo stripes is changed for each servo band. Thus, since the recorded servo band ID is unique for each servo band, the servo band can be uniquely specified only by reading one servo band with the servo signal reading element.

As a method for uniquely specifying the servo band, there is a method using a staggered method as shown in ECMA-319 (June 2001). In the staggered method, a group of a pair of non-parallel magnetic stripes (the servo stripes) arranged continuously in the longitudinal direction of the magnetic tape is recorded so as to be shifted in the longitudinal direction of the magnetic tape for each servo band. Since this combination of shifting methods between adjacent servo bands is unique throughout the magnetic tape, it is possible to uniquely identify the servo band in a case of reading the servo pattern with two servo signal reading elements.

In addition, as shown in ECMA-319 (June 2001), information indicating the position in the longitudinal direction of the magnetic tape (also referred to as "longitudinal position (LPOS) information") is usually embedded in each servo band. The LPOS information is also recorded by shifting the position of the pair of servo stripes in the longitudinal direction of the magnetic tape, similar to the UDIM information. However, unlike UDIM information, in the LPOS information, the same signal is recorded in each servo band.

Other information different from the above UDIM information and LPOS information can be embedded in the servo band. In this case, the information to be embedded may be different for each servo band, such as the UDIM information, or may be common to all servo bands, such as the LPOS information. In addition, as a method for embedding information in the servo band, methods other than those described above can be adopted. For example, a predetermined code may be recorded by thinning out a predetermined pair from a group of a pair of servo stripes.

The servo pattern forming head is called a servo write head. In one aspect, the servo pattern having the same servo band intervals between the inner portion and the outer portion can be formed by maintaining a constant tension applied in the tape longitudinal direction in a case where the servo pattern is formed by the servo write head while running the magnetic tape after the heat treatment. Further, in one aspect, the servo band interval can be changed between the inner portion and the outer portion by changing the tension during the formation of the servo pattern. As the tension applied in the tape longitudinal direction during servo pattern formation increases, the amount of tape shrinkage in the tape width direction increases, thus by the tension applied in the tape longitudinal direction in a case of forming the servo pattern on the inner portion is reduced and the tension applied in the tape longitudinal direction in a case of forming the servo pattern on the outer portion, the interval between two adjacent servo band intervals can be made to be narrower in the inner portion and wider in the outer portion, contrary to the deformation which may temporally occur in the magnetic tape in the magnetic tape cartridge. Further, the tension applied in the tape longitudinal direction in a case of forming the servo pattern can be changed so as to increase or decrease continuously or stepwise. In a case where the servo band interval difference is a negative value (that is, in a case where the servo band interval in the inner portion is narrower than the servo band interval in the outer portion), in the portion between the position of 51 m from the tape outer end and the position of 51 m from the tape inner end, the interval between two adjacent servo band intervals is smaller than $G_{outer}$, greater than $G_{inner}$, and smaller as being closer to the tape inner end, as the value on 100th day from the date of magnetic tape cartridge manufacture. The tension is preferably 1.5 N (Newton) or less, and more preferably 1.0 N or less, from the viewpoint of preventing irreversible tape width deformation from occurring in the magnetic tape in the servo pattern forming step. The tension is preferably 0.1 N or more from the viewpoint of stably running and winding the magnetic tape in the servo pattern forming step. Therefore, it is preferable that the tension applied in the longitudinal direction of the magnetic tape in a case of forming the servo pattern is kept constant within the above range or changed within the above range.

The servo write head usually has a pair of gaps corresponding to the pair of magnetic stripes by the number of servo bands. The interval between two adjacent gaps can be kept constant. Alternatively, by changing the interval between two adjacent gaps between a case of forming the servo pattern on the inner portion of the magnetic tape and a case of forming the servo pattern on the outer portion, the servo band interval between the inner portion and the outer portion is changed. Usually, a core and a coil are connected to each pair of gaps, and a magnetic field generated in the core can generate a leakage magnetic field in the pair of gaps by supplying a current pulse to the coils. In a case of forming the servo pattern, by inputting a current pulse while running the magnetic tape on the servo write head, the magnetic pattern corresponding to the pair of gaps is transferred to the magnetic tape to form the servo pattern. The width of each gap can be appropriately set according to the density of the servo pattern to be formed. The width of each gap can be set to 1 μm or less, 1 to 10 μm, or 10 μm or more, for example.

Before the servo pattern is formed on the magnetic tape, the magnetic tape is usually subjected to an erase process. The erase process can be performed by applying a uniform magnetic field to the magnetic tape using a DC magnet or an AC magnet. The erase process includes direct current (DC) erase and alternating current erase (AC). The AC erase is performed by gradually decreasing the strength of the magnetic field while reversing the direction of the magnetic field applied to the magnetic tape. On the other hand, DC erase is performed by applying a unidirectional magnetic field to the magnetic tape. There are two additional methods for DC erase. The first method is a horizontal DC erase that applies a magnetic field in one direction along the longitudinal direction of the magnetic tape. The second method is a vertical DC erase that applies a magnetic field in one direction along the thickness direction of the magnetic tape. The erase process may be performed on the entire magnetic tape or may be performed for each servo band of the magnetic tape.

The direction of the magnetic field of the servo pattern to be formed is determined according to the direction of the erase. For example, in a case where the horizontal DC erase is performed on the magnetic tape, the servo pattern is formed so that the direction of the magnetic field is opposite to the direction of the erase. Thereby, the output of the servo signal obtained by reading the servo pattern can be increased. As disclosed in JP2012-053940A, in a case where the magnetic pattern is transferred using the gap to the magnetic tape subjected to vertical DC erase, the servo signal obtained by reading the formed servo pattern has a monopolar pulse shape. On the other hand, in a case where a magnetic pattern is transferred using the gap to the magnetic tape subjected to horizontal DC erase, a servo signal obtained by reading the formed servo pattern has a bipolar pulse shape.

The magnetic tape on which the servo pattern is formed is accommodated in the magnetic tape cartridge, and the magnetic tape cartridge is mounted on the magnetic tape device, and data recording to the magnetic tape and/or reproducing of the recorded data are performed.

Magnetic Tape Device

According to one aspect, there is provided a magnetic tape device comprising the magnetic tape cartridge and a magnetic head.

In the invention and the specification, the "magnetic tape device" means a device capable of performing at least one of the recording of data on the magnetic tape or the reproducing of data recorded on the magnetic tape. Such a device is generally called a drive. The magnetic tape device can be a sliding magnetic tape device. The sliding type magnetic tape device refers to a device in which a magnetic layer surface and a magnetic head come into contact with each other and slide when recording data on the magnetic tape and/or reproducing recorded data.

The magnetic head included in the magnetic tape device can be a recording head capable of performing the recording of data on the magnetic tape, and can also be a reproducing head capable of performing the reproducing of data recorded on the magnetic tape. In addition, in one aspect, the magnetic tape device can include both of a recording head and a reproducing head as separate magnetic heads. In another aspect, the magnetic head included in the magnetic tape device may be configured to include both an element for recording data (the recording element) and an element for reproducing data (the reproducing element) in one magnetic head. Hereinafter, elements for recording and reproducing data are collectively referred to as "data elements". As the reproducing head, a magnetic head (MR head) including a magnetoresistive (MR) element capable of reading data recorded on the magnetic tape with excellent sensitivity as the reproducing element is preferable. As the MR head, various known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) including a servo signal reading element may be included in the magnetic tape device. For example, the magnetic head that records data and/or reproduces the recorded data (hereinafter also referred to as a "recording and reproducing head") can include two servo signal reading elements, and the two servo signal reading elements can simultaneously read two adjacent servo bands across the data band. One or more data elements can be arranged between the two servo signal reading elements.

In the magnetic tape device, the recording of data on the magnetic tape and/or the reproducing of data recorded on the magnetic tape can be performed by bringing the surface of the magnetic layer of the magnetic tape into contact with the magnetic head and sliding. The magnetic tape device need only include the magnetic tape cartridge according to one aspect of the invention, and well-known technologies can be applied for the other configurations.

In a case of recording data and/or reproducing recorded data, first, tracking using the servo signal is performed. Stated another way, by causing the servo signal reading element to follow a predetermined servo track, the data element is controlled to pass on the target data track. The data track is moved by changing the servo track read by the servo signal reading element in the tape width direction.

The recording and reproducing head can also perform recording and/or reproduction with respect to other data bands. In that case, the servo signal reading element may be moved to a predetermined servo band by using the previously described UDIM information, and tracking for the servo band need only be started.

Figure 2:
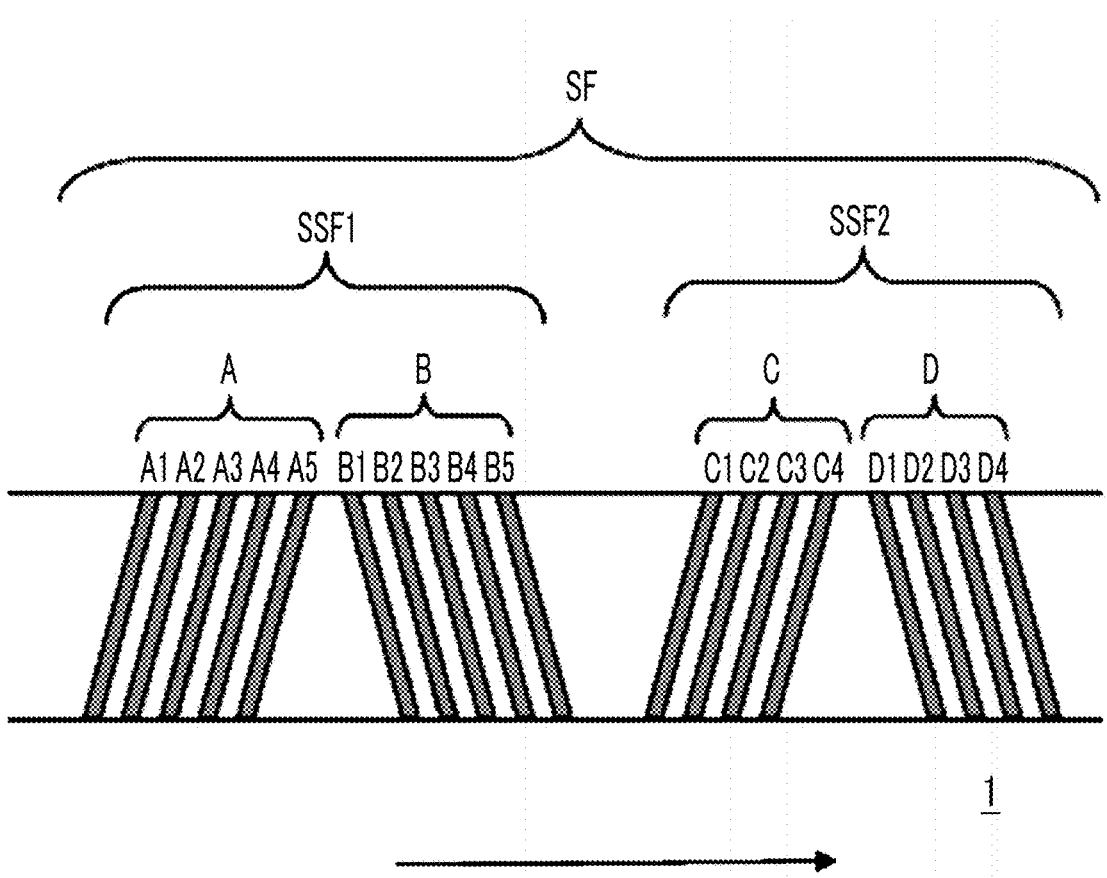
FIG. 2 shows an arrangement example of a servo pattern of a linear tape-open (LTO) ultrium format tape.
Figure 3:
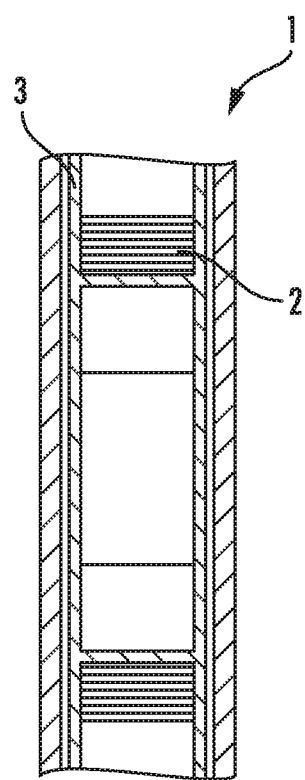
FIG. 3 is a cross-sectional view of an example of an embodiment of a magnetic tape cartridge of the invention. Magnetic tape cartridge 1 comprises a single reel 3 around which is wound a magnetic tape 2.
Figure 4:
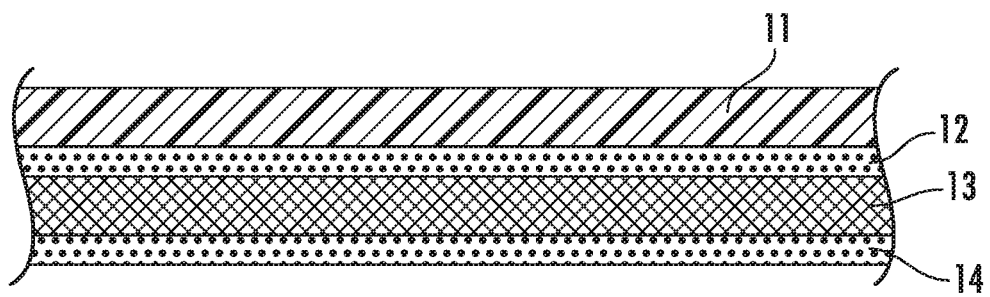
FIG. 4 is a schematic cross-sectional illustration of an embodiment of a magnetic tape suitable for use with the magnetic tape cartridge of the invention. The depicted embodiment of a magnetic tape includes a non-magnetic support 13; a magnetic layer 11 including a ferromagnetic powder and a binding agent; a non-magnetic layer 12 including a non-magnetic powder and a binding agent, between the non-magnetic support and the magnetic layer; and a back coating layer 14 including a non-magnetic powder and a binding agent on a surface side of the non-magnetic support opposite to a surface side provided with the magnetic layer.

FIG. 1 shows arrangement examples of a data band and a servo band. In FIG. 1, a plurality of servo bands 1 are disposed between the guide bands 3 in the magnetic layer of the magnetic tape MT. A plurality of regions 2 interposed between two servo bands are a data band. The servo pattern is a magnetization region, and is formed by magnetizing a specific region of the magnetic layer with the servo write head. The region magnetized by the servo write head (the position where the servo pattern is formed) is determined by the standard. For example, in the LTO Ultrium format tape, which is an industry standard, a plurality of servo patterns inclined with respect to the tape width direction are formed on the servo band as shown in FIG. 2 in a case of magnetic tape manufacturing. Specifically, in FIG. 2, the servo frame SF on the servo band 1 is configured with a servo subframe 1 (SSF1) and a servo subframe 2 (SSF2). The servo subframe 1 is configured with A burst (symbol A in FIG. 2) and B burst (symbol B in FIG. 2). The A burst is configured with servo patterns A1 to A5, and the B burst is configured with servo patterns B1 to B5. On the other hand, the servo subframe 2 is configured with C burst (symbol C in FIG. 2) and D burst (symbol D in FIG. 2). The C burst is configured with servo patterns C1 to C4, and the D burst is configured with servo patterns D1 to D4. Such 18 servo patterns are arranged in subframes, arranged in an array of 5, 5, 4, 4, in a set of 5 and 4 and are used to identify the servo frame. FIG. 2 shows one servo frame for explanation. However, in practice, a plurality of servo frames are arranged in the running direction in each servo band in the magnetic layer of the magnetic tape on which timing-based servo head tracking is performed. In FIG. 2, the arrow indicates the running direction. For example, an LTO Ultrium format tape usually has 5000 or more servo frames per 1 m of tape length in each servo band of the magnetic layer.

The magnetic tape device includes the magnetic tape cartridge according to one aspect of the invention. Therefore, it is possible to suppress the occurrence of the error in a case of reproducing the data recorded on the magnetic tape.

EXAMPLES

Hereinafter, one aspect of the invention will be described with reference to examples. However, the invention is not limited to aspects shown in the examples. Unless otherwise noted, "parts" and "%" in the following description mean "parts by mass" and "% by mass". "eq" is an equivalent which is a unit which cannot be converted into the SI unit.

In addition, the various steps and operations described below were performed in an environment of a temperature of 20° C. to 25° C. and relative humidity of 40% to 60%, unless otherwise noted.

In Table 1, "BaFe" indicates the hexagonal barium ferrite powder, "SrFe1" and "SrFe2" indicate the hexagonal strontium ferrite powder, "ε-iron oxide" indicates the ε-iron oxide powder, and "PEN" indicates a polyethylene naphthalate support, "PA" indicates an aromatic polyamide support, and "PET" indicates a polyethylene terephthalate support.

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin including a SO$_3$Na group as a polar group (UR-4800 manufactured by Toyobo Co., Ltd. (polar group amount: 80 meq/kg)), and 570.0 parts of a mixed solution of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of 65% and a Brunauer-Emmett-Teller (BET) specific surface area of 20 m$^2$/g, and dispersed in the presence of zirconia beads by a paint shaker for 5 hours.

After the dispersion, the dispersion liquid and the beads were separated by a mesh and an alumina dispersion was obtained.

(2) Magnetic Layer Forming Composition List
Magnetic Liquid
Ferromagnetic powder: 100.0 parts
Hexagonal barium ferrite powder having average particle size (average plate diameter) of 21 nm (in Table 1, "BaFe")
SO$_3$Na group-containing polyurethane resin: 14.0 parts
Weight-average molecular weight: 70,000, SO$_3$Na group: 0.2 meq/g
Cyclohexanone: 150.0 parts
Methyl ethyl ketone: 150.0 parts
Abrasive Solution
Alumina dispersion prepared in the section (1): 6.0 parts
Silica Sol (projection forming agent liquid)
Colloidal silica (Average particle size: 120 nm) 2.0 parts
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered trademark) L manufactured by Tosoh Corporation): 2.5 parts
Finishing Additive Solvent
Cyclohexanone: 200.0 parts
Methyl ethyl ketone: 200.0 parts (3) Non-Magnetic Layer Forming Composition List
Non-magnetic inorganic powder: α-iron oxide: 100.0 parts
Average particle size (average long axis length): 0.15 μm
Average acicular ratio: 7
BET specific surface area: 52 m$^2$/g
Carbon black: 20.0 parts
Average particle size: 20 nm
SO$_3$Na group-containing polyurethane resin: 18.0 parts
Weight-average molecular weight: 70,000, SO$_3$Na group: 0.2 meq/g
Stearic acid: 2.0 parts
Stearic acid amide: 0.2 parts
Butyl stearate: 2.0 parts
Cyclohexanone: 300.0 parts
Methyl ethyl ketone: 300.0 parts (4) Back Coating Layer Forming Composition List
Carbon black: 100.0 parts
Dibutyl phthalate (DBP) oil absorption: 74 cm$^3$/100 g
Nitrocellulose: 27.0 parts
Polyester polyurethane resin including sulfonic acid group and/or salt thereof: 62.0 parts
Polyester resin: 4.0 parts
Alumina powder (BET specific surface area: 17 m$^2$/g): 0.6 parts
Methyl ethyl ketone: 600.0 parts
Toluene: 600.0 parts
Polyisocyanate (CORONATE L manufactured by Tosoh Corporation): 15.0 parts (5) Preparation of Each Layer Forming Composition The magnetic layer forming composition was prepared by the following method. The magnetic liquid was prepared by dispersing (beads-dispersing) each component by using a batch type vertical sand mill for 24 hours. Zirconia beads having a bead diameter of 0.5 mm were used as the dispersion beads. The prepared magnetic liquid, the abrasive solution, and other components (silica sol, other components, and finishing additive solvent) were mixed with each other and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

The non-magnetic layer forming composition was prepared by the following method. The components described above excluding the lubricant (stearic acid, stearic acid amide, and butyl stearate) were kneaded and diluted by an open kneader, and subjected to a dispersion process with a transverse beads mill disperser. After that, the lubricant (stearic acid, stearic acid amide, and butyl stearate) was added, and stirred and mixed with a dissolver stirrer, and a non-magnetic layer forming composition was prepared. The back coating layer forming composition was prepared by the following method. The components excluding polyisocyanate were introduced in a dissolver stirrer and stirred at a circumferential speed of 10 m/sec for 30 minutes, and the dispersion process was performed with a transverse beads mill disperser. After that, polyisocyanate was added, and stirred and mixed with a dissolver stirrer, and a back coating layer forming composition was prepared.

(6) Manufacturing Method of Magnetic Tape and Magnetic Tape Cartridge

The non-magnetic layer forming composition prepared in the section (5) was applied to a surface of a biaxially stretched support having 4.6 μm of thickness and the kind shown in Table 1 so that the thickness after the drying becomes 0.2 μm and was dried to form a non-magnetic layer. Then, the magnetic layer forming composition prepared in the section (5) was applied onto the non-magnetic layer so that the thickness after the drying becomes 0.1 μm, and a coating layer was formed. After that, a homeotropic alignment process was performed by applying a magnetic field having a magnetic field strength of 0.3 T in a vertical direction with respect to a surface of a coating layer, while the coating layer of the magnetic layer forming composition is wet (not dried), and was dried to form a magnetic layer. After that, the back coating layer forming composition prepared in the section (5) was applied to the surface of the support on a side opposite to the surface where the non-magnetic layer and the magnetic layer were formed, so that the thickness after the drying becomes 0.3 μm, and was dried to form a back coating layer.

After that, a surface smoothing treatment (a calendar process) was performed by using a calendar roll configured of only a metal roll, at a speed of 100 m/min, linear pressure of 300 kg/cm (1 kg/cm is 0.98 kN/m), and a calendar temperature (a surface temperature of a calendar roll) of 90° C.

Then, the heat treatment was performed by storing the long magnetic tape raw material in a heat treatment furnace at the atmosphere temperature of 70° C. (the heat treatment time: 36 hours). After the heat treatment, the magnetic tape was obtained by slitting the long magnetic tape raw material to have a width of ½ inches.

The slit magnetic tape (a length of 960 m) was wound around the core for heat treatment, and the heat treatment was performed in a state of being wound around the core. As the core for heat treatment, a solid core member (the outer diameter: 50 mm) formed of a resin and having 0.8 GPa of a modulus of bending elasticity was used, and the tension at the time of the winding was set as 0.6 N. The heat treatment was performed at the heat treatment temperature shown in Table 1 for 5 hours. The weight absolute humidity in the atmosphere in which the heat treatment was performed was 10 g/kg Dry air.

After the heat treatment, by extracting the magnetic tape from the core for heat treatment after the magnetic tape and the core for heat treatment are sufficiently cooled, and forming the servo pattern by the commercially available servo writer on the magnetic layer of the magnetic tape, the magnetic tape including a data band, a servo band, and a guide band in the disposition according to a linear tape-open (LTO) Ultrium format shown in FIG. 2, and including a servo pattern (timing-based servo pattern) having the disposition and shape according to the LTO Ultrium format on the servo band was obtained. The tension applied in the longitudinal direction of the magnetic tape during the servo pattern formation was kept constant within the range of 0.1N to 1.5N without changing. The formed servo pattern is the servo pattern according to the description of Japanese industrial standards (JIS) X6175: 2006 and Standard ECMA-319 (June 2001).

The magnetic tape (the length 960 m) after the servo pattern is formed was wound around the core for temporary winding, and then was wound around a reel (reel outer diameter: 44 mm) of the magnetic tape cartridge (LTO Ultrium 8 data cartridge) from the core for temporary winding, by the final product length (950 m). The remaining length of 10 m was cut out and the leader tape based on section 9 of Standard ECMA (European Computer Manufacturers Association)-319 (June 2001) Section 3 was bonded to the end of the cut-out side by using a commercially available splicing tape. As the core for temporary winding, a solid core member having the same outer diameter and formed of the same material as the core for heat treatment was used, and the tension at the time of winding was set as 0.6 N.

As described above, a single reel type magnetic tape cartridge of Example 1 in which the magnetic tape having a length of 950 m was wound around a reel was manufactured.

For each Example, each Comparative Example, and Reference Example, three magnetic tape cartridges were manufactured, one was used to obtain the servo band interval difference, and other one was used for other physical property evaluations and remained one was used for a recording and reproducing test described later. The date when the magnetic tape was accommodated in the magnetic tape cartridge was recorded on a RFID tag in each magnetic tape cartridge as the date of magnetic tape cartridge manufacture (date of manufacturer).

Example 2, Comparative Examples 4 and 5

A magnetic tape cartridge was manufactured in the same manner as in Example 1, except that the heat treatment performed in a state where the magnetic tape was wound around the core for heat treatment, was performed at a heat treatment temperature shown in Table 1.

Examples 4 and 5

A magnetic tape cartridge was manufactured in the same manner as in Example 1 except that a biaxially stretched support shown in Table 1 was used as the support.

Example 6

A magnetic tape cartridge was produced in the same manner as in Example 1 except that the ferromagnetic powder was changed to the hexagonal strontium ferrite powder ("SrFe1" in Table 1) obtained by the method described below.

Method for Producing Hexagonal Strontium Ferrite Powder 1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$, were weighted and mixed in a mixer to obtain a raw material mixture.

The obtained raw material mixture was melted with a platinum crucible at a melting temperature of 1390° C., and the hot water outlet provided at the bottom of the platinum crucible was heated while stirring the melt, and the melt was discharged into a rod shape at about 6 g/sec.

The hot water was rolled and quenched with a water-cooled twin roller to produce an amorphous body.

280 g of the produced amorphous body was charged into an electric furnace, heated to 635° C. (the crystallization temperature) at a heating rate of 3.5° C./min, and kept at the same temperature for 5 hours to precipitate (crystallization) the hexagonal strontium ferrite particles.

Next, the crystallized product obtained above containing the hexagonal strontium ferrite particles was coarsely pulverized in a mortar, and 1000 g of zirconia beads having a particle diameter of 1 mm and 800 mL of acetic acid aqueous solution with a concentration of 1% were added to a glass bottle and dispersed in a paint shaker for 3 hours. Thereafter, the obtained dispersion liquid was separated from the beads and placed in a stainless beaker. The dispersion liquid was allowed to stand at a liquid temperature of 100° C. for 3 hours to dissolve the glass component, precipitated by a centrifuge, washed repeatedly by decantation, and dried in the heating furnace at a furnace temperature of 110° C. for 6 hours to obtain the hexagonal strontium ferrite powder.

The obtained hexagonal strontium ferrite powder had an average particle size of 18 nm, an activation volume of 902 nm$^3$, an anisotropy constant Ku of $2.2 \times 10^5$ J/m$^3$, and a mass magnetization σs of 49 A·m$^2$/kg.

12 mg of sample powder was collected from the hexagonal strontium ferrite powder obtained above, and the elemental analysis of the filtrate obtained by partially dissolving the sample powder under the dissolution conditions exemplified above was performed with an ICP analyzer to obtain the surface layer content of the neodymium atom.

Separately, 12 mg of sample powder was collected from the hexagonal strontium ferrite powder obtained above, and the elemental analysis of the filtrate obtained by completely dissolving the sample powder under the dissolution conditions exemplified above was performed with an ICP analyzer to obtain the bulk content of the neodymium atom.

The content (the bulk content) of neodymium atoms with respect to 100 atomic % of iron atoms in the hexagonal strontium ferrite powder obtained above was 2.9 atomic %. Moreover, the surface layer content of the neodymium atom was 8.0 atomic %. It was confirmed that the ratio between the surface layer content and the bulk content, "surface layer content/bulk content" was 2.8, and neodymium atoms were unevenly distributed in the surface layer of the particles.

It was confirmed that the powder obtained above shows the crystal structure of hexagonal ferrite, by scanning a CuKα ray under conditions of a voltage of 45 kV and an intensity of 40 mA, and measuring an X-ray diffraction pattern under the following conditions (the X-ray diffraction analysis). The powder obtained above showed a crystal structure of the magnetoplumbite type (M type) hexagonal ferrite. The crystal phase detected by X-ray diffraction analysis was a magnetoplumbite type single phase.

PANalytical X' Pert Pro diffractometer, PIXcel detector
Incident beam and diffracted beam Soller slit: 0.017 radian
Dispersion slit fixed angle: ¼ degree
Mask: 10 mm
Anti-scattering slit: ¼ degree
Measurement mode: continuous
Measurement time per step: 3 seconds
Measurement speed: 0.017 degrees per second
Measurement step: 0.05 degrees Example 7

A magnetic tape cartridge was produced in the same manner as in Example 1 except that the ferromagnetic powder was changed to the hexagonal strontium ferrite powder ("SrFe2" in Table 1) obtained by the method described below.

Method for Producing Hexagonal Strontium Ferrite Powder 1725 g of SrCO$_3$, 666 g of H$_3$BO$_3$, 1332 g of Fe$_2$O$_3$, 52 g of Al (OH)$_3$, 34 g of CaCO$_3$, and 141 g of BaCO$_3$ were weighted and mixed in a mixer to obtain a raw material mixture.

The obtained raw material mixture was melted with a platinum crucible at a melting temperature of 1380° C., and the hot water outlet provided at the bottom of the platinum crucible was heated while stirring the melt, and the melt was discharged into a rod shape at about 6 g/sec.
The hot water was rolled and quenched with a water-cooled twin roll to produce an amorphous body.

280 g of the obtained amorphous body was charged into an electric furnace, heated to 645° C. (the crystallization temperature), and kept at the same temperature for 5 hours to precipitate (crystallization) the hexagonal strontium ferrite particles.

Next, the crystallized product obtained above containing the hexagonal strontium ferrite particles was coarsely pulverized in a mortar, and 1000 g of zirconia beads having a particle diameter of 1 mm and 800 mL of acetic acid aqueous solution with a concentration of 1% were added to a glass bottle and dispersed in a paint shaker for 3 hours. Thereafter, the obtained dispersion liquid was separated from the beads and placed in a stainless beaker. The dispersion liquid was allowed to stand at a liquid temperature of 100° C. for 3 hours to dissolve the glass component, precipitated by a centrifuge, washed repeatedly by decantation, and dried in the heating furnace at a furnace temperature of 110° C. for 6 hours to obtain the hexagonal strontium ferrite powder.

The obtained hexagonal strontium ferrite powder had an average particle size of 19 nm, an activation volume of 1102 nm$^3$, an anisotropy constant Ku of $2.0 \times 10^5$ J/m$^3$, and a mass magnetization σs of 50 A·m$^2$/kg.

Example 8

A magnetic tape cartridge was produced in the same manner as in Example 1 except that the ferromagnetic powder was changed to ε-iron oxide powder obtained by the method described below.

Method for Producing ε-Iron Oxide Powder 8.3 g of iron (III) nitrate nonahydrate, 1.3 g of gallium nitrate (III) octahydrate, 190 mg of cobalt (II) nitrate hexahydrate, 150 mg of titanium (IV) sulfate, 1.5 g of polyvinylpyrrolidone (PVP) were dissolved in 90 g of pure water and were stirred using a magnetic stirrer, and then, 4.0 g of ammonia aqueous solution having 25% of a concentration was added under the condition of 25° C. of atmosphere temperature in atmosphere, and was stirred for 2 hours under the temperature condition of 25° C. of atmosphere temperature. A citric acid solution obtained by dissolving 1 g of citric acid in 9 g of pure water was added to the obtained solution, and the mixture was stirred for 1 hour. The powder precipitated after stirring was collected by centrifugation, washed with pure water, and dried in a heating furnace having a furnace temperature of 80° C.

800 g of pure water was added to the dried powder, and the powder was dispersed again in water to obtain a dispersion liquid. The obtained dispersion liquid was heated to a liquid temperature of 50° C., and 40 g of a 25% strength aqueous ammonia solution was added dropwise with stirring. After stirring for 1 hour while keeping the temperature at 50° C., 14 mL of tetraethoxysilane (TEOS) was added dropwise and stirred for 24 hours. 50 g of ammonium sulfate was added to the obtained reaction solution, and the precipitated powder was collected by centrifugation, washed with pure water, and dried in a heating furnace at a furnace temperature of 80° C. for 24 hours to obtain a ferromagnetic powder precursor.

The precursor of the obtained ferromagnetic powder was loaded into a heating furnace having a furnace temperature of 1000° C. in an atmosphere and subjected to a heat treatment for 4 hours.

The heat-treated ferromagnetic powder precursor was put into a 4 mol/L sodium hydroxide (NaOH) aqueous solution, and the liquid temperature was maintained at 70° C. and stirred for 24 hours, and then the silicic acid compound which is an impurity was removed from the precursor of the heat treated ferromagnetic powder.

Thereafter, the ferromagnetic powder from which the silicic acid compound was removed was collected by centrifugation, and washed with pure water to obtain a ferromagnetic powder.

The composition of the obtained ferromagnetic powder was confirmed by inductively coupled plasma-optical emission spectrometry (ICP-OES), and was a Ga, Co, and Ti-substituted type ε-iron oxide (ε-Ga$_{0.58}$Fe$_{1.42}$O$_3$). Further, an X-ray diffraction analysis was performed under the same conditions as described for Example 6 above, and it was confirmed that the obtained ferromagnetic powder does not contain the α-phase and γ-phase crystal structures and contain the single-phase crystal structure of c phase (the ε-iron oxide type crystal structure), based on the peak of the X-ray diffraction pattern.

The obtained ε-iron oxide powder had an average particle size of 12 nm, an activation volume of 746 nm$^3$, an anisotropy constant Ku of 1.2×10$^5$ J/m$^3$, and a mass magnetization σs of 16 A·m$^2$/kg.

The activation volume and the anisotropy constant Ku of the above hexagonal strontium ferrite powder and ε-iron oxide powder are the value obtained by the above-described method using a vibrating sample magnetometer (manufactured by Toei Kogyo Co., Ltd.) for each ferromagnetic powder.

The mass magnetization σs is a value measured at a magnetic field strength of 15 kOe using a vibrating sample magnetometer (manufactured by Toei Kogyo Co., Ltd.).

Reference Example 1

The magnetic tape cartridge was produced by the same method as Example 1 except that a biaxially stretched support having a thickness of 5.3 μm as shown in Table 1 was used as the support, and the non-magnetic layer was formed so that the thickness after drying was 0.3 μm.

Comparative Example 1

A magnetic tape cartridge was manufactured in the same manner as in Example 1, except that the heat treatment in a state where the magnetic tape was wound around the core for heat treatment, was not performed.

Comparative Example 2

A magnetic tape cartridge was manufactured in the same manner as in Example 4, except that the heat treatment in a state where the magnetic tape was wound around the core for heat treatment, was not performed.

Comparative Example 3

A magnetic tape cartridge was manufactured in the same manner as in Example 5, except that the heat treatment in a state where the magnetic tape was wound around the core for heat treatment, was not performed.

Example 3

The magnetic tape cartridge was produced by the same method as Example 1 except that the servo pattern formation after heat treatment with the magnetic tape wound around the heat treatment core was performed such that a tension was continuously changed in a range of 0.1 N to 1.5 N so that the tension applied in the longitudinal direction of the magnetic tape became larger in a portion located far from the reel in a case of being accommodated in the magnetic tape cartridge, as compared with a portion located close to the reel.

Comparative Example 6

The magnetic tape cartridge was produced in the same manner as in Example 1 except for the following points.

The heat treatment performed in a state where the magnetic tape was wound around the core for heat treatment was performed at the heat treatment temperature shown in Table 1.

The servo pattern formation after heat treatment with the magnetic tape wound around the heat treatment core was performed such that a tension was continuously changed in a range of 0.1 N to 1.5 N so that the tension applied in the longitudinal direction of the magnetic tape became larger in a portion located far from the reel in a case of being accommodated in the magnetic tape cartridge, as compared with a portion located close to the reel.

Comparative Example 7

The magnetic tape cartridge was produced in the same manner as in Example 1 except for the following points.

The heat treatment performed in a state where the magnetic tape was wound around the core for heat treatment was performed at the heat treatment temperature shown in Table 1. The magnetic tape cartridge was produced by the same method as Example 1 except that the servo pattern was formed while maintaining the tension constant within a range of 0.1 N to 1.5 N without changing the tension applied in the longitudinal direction of the magnetic tape during the servo pattern formation, before the heat treatment is performed to the magnetic tape after slitting to ½ inch width in a state where the winding core for heat treatment is wound.

Evaluation of Magnetic Tape (1) Servo Band Interval Difference

For each magnetic tape cartridge, the servo band interval difference ($G_{inner}-G_{outer}$) was obtained on 100th day from the date of magnetic tape cartridge manufacture by the following method in an environment of the temperature of 23° C.±1° C. and the relative humidity of 50%±5%.

In order to obtain the interval between two servo bands adjacent to each other with the data band interposed therebetween, the dimension of the servo pattern is required. The standard of servo pattern dimensions varies depending on the generation of LTO. Therefore, first, using a magnetic force microscope or the like, the average distance AC between the four stripes corresponding to the A burst and the C burst and the azimuth angle α of the servo pattern are measured.

Next, using the servo head comprising the reel tester and two servo signal reading elements (hereinafter, one is referred to as the upper side and the other is referred to as the lower side) fixed in a direction orthogonal to the longitudinal direction of the magnetic tape with intervals, the servo pattern formed in the magnetic tape is sequentially read along the tape longitudinal direction. The average time between 5 stripes corresponding to A burst and B burst over the length of 1 LPOS word is defined as a. The average time between 4 stripes corresponding to A burst and C burst over the length of 1 LPOS word is defined as b. At this time, the value defined by $AC*(½-a/b)/(2*\tan(α))$ represents a reading position PES in a width direction based on the servo signal obtained by the servo signal reading element over the length of 1 LPOS word. Reading of the servo pattern for one LPOS word is simultaneously performed by two upper and lower servo signal reading elements. The PES value obtained by the upper servo signal reading element is PES1, and the PES value obtained by the lower servo signal reading element is PES2. As "PES1-PES2", for one LPOS word, the interval between two adjacent servo bands with the data band therebetween can be obtained. This is because the upper and lower servo pattern reading elements are fixed to the servo head and the interval therebetween is not changed. Since a total of five servo bands are arranged on the magnetic tape, the number of intervals between two adjacent servo bands with the data band interposed therebetween is four. For each of these four intervals, the arithmetic average of "PES1-PES2" obtained for all LPOS words in the range of 49 m to 51 m from the tape outer end of the magnetic tape (the total length: 950 m) accommodated in the magnetic tape cartridge is set as the servo band interval $G_{outer}$. For each of these four intervals, the arithmetic average of "PES1-PES2" obtained for all LPOS words in the range of 49 m to 51 m from the tape inner end of the magnetic tape (the total length: 950 m) accommodated in the magnetic tape cartridge is set as the servo band interval $G_{inner}$. The obtained difference ($G_{inner}$–$G_{outer}$) between $G_{inner}$ and $G_{outer}$ is set as the servo band interval difference.

(2) Tape Width Difference ($W_{inner}$–$W_{outer}$)

The magnetic tape was extracted from each magnetic tape cartridge on 100th day from the date of magnetic tape cartridge manufacture, and the following evaluations were performed with respect to the extracted magnetic tape.

The leader tape bonded to the tape outer end was removed, and a tape sample having a length of 20 cm and including the position of 50 m±1 m from the tape outer end, and a tape sample having a length of 20 cm and including the position of 50 m±1 m from the tape inner end were cut out. The tape width of each tape sample was measured at the center in a longitudinal direction of the tape sample in a state of being sandwiched between two sheets of slide glass, in order to remove the effect of curl. The measurement of the tape width was performed within 20 minutes after extracting the magnetic tape from the magnetic tape cartridge, using a laser high accuracy dimension measurement device LS-7030 manufactured by Keyence Corporation. In each tape sample, the tape width was respectively measured seven times (N=7), and an arithmetical mean of five measured values excluding the maximum value and the minimum value from the measured values obtained in the seven times of measurements was obtained. The obtained arithmetic average was used as the tape width (the tape width $W_{inner}$ or the tape width $W_{outer}$) at each position to calculate a tape width difference ($W_{inner}$–$W_{outer}$).

(3) Tape Width Deformation Rate

A tape sample having a length of 20 cm including a position of 10 m±1 m from the tape outer end of the tape was extracted from the magnetic tape taken out from the magnetic tape cartridge in the above section (2), and the tape width was determined in the same manner as the method in the above section (2). The determined tape width was defined as the tape width before storage.

The tape sample having a length of 20 cm and including the position of 10 m±1 m from a tape outer end was stored in a dry environment at a temperature of 52° C. for 24 hours, in a state where the measurement of the tape width before storage was performed, and a load of 100 g was applied in a tape longitudinal direction, by holding one end portion of the tape sample and hanging a weight of 100 g on the other end portion. After the storage, a tape width was obtained within 20 minutes after removing the load, in the same manner as in the method in the section (2), and the tape width was set as the tape width after storage.

A value obtained by dividing a difference of tape widths before and after storage (tape width before storage–tape width after storage) by the tape width before storage×$10^6$ (unit: ppm) was calculated and set as the tape width deformation rate.

(4) Tape Thickness 10 tape samples (for example, length of 5 cm) were cut out from a random portion of the magnetic tape extracted from the magnetic tape cartridge in the above section (2), these tape samples were overlapped, and the thickness was measured. The measurement of the thickness was performed using a compact amplifier Millimar 1240 and a digital thickness meter of induction probe Millimar 1301 manufactured by MARH. A value which is one tenth of the measured thickness (thickness per one tape sample) was set as the tape thickness.

Recording and Reproducing Test

After storing the magnetic tape cartridge on which data is recorded with the regulated capacity of data in an environment of 40° C. of the temperature and 80% of the relative humidity for 3 months (hereinafter referred to as "long-term storage"), it was evaluated whether all recorded data can be reproduced (read). The recording and the reproducing were performed using a LTO Ultrium 8 (LTO 8) drive. The regulated capacity is 12.0 TB (terabytes).

The recording of data was performed after placing the magnetic tape cartridge in the evaluation environment (20 to 25° C. of temperature and 40 to 60% of relative humidity) on 100th day from the date of magnetic tape cartridge manufacture, leaving for longer than a day, and exposing to the same environment. In a case where no error occurs during recording and the regulated capacity can be recorded, the evaluation result of the recording test was "A". Meanwhile, in a case where the error occurs during the recording and the recording of the regulated capacity cannot be performed, the cartridge cannot be used in the subsequent evaluation and the evaluation result of the recording test was "B". The case of the evaluation result "B" described above is specifically a case where the data element cannot be positioned at a position to be recorded and the drive sends an error signal and stopped, even in a case where a servo pattern was read by a servo signal reading element of the drive and the head tracking was performed. In this case, "-" was written in the column of the evaluation result of the reproducing test in Table 1. However, long-term storage was also performed in this case.

Furthermore, in a case where the evaluation result of the recording test was "A", after the above storage, reproduction was performed with the same drive as the recording drive under the evaluation environment of the same temperature and the same humidity as the recording evaluation environment. The reproducing was also performed after leaving the magnetic tape cartridge in the evaluation environment for longer than a day, and exposing to the same environment. Regarding the entire data recorded on the magnetic tape in the magnetic tape cartridge, in a case where the reproducing was completed without the occurrence of the error, the evaluation result of the reproducing test was "A". In a case where the data could not be properly read from the reproducing signal due to a poor signal-to-noise-ratio (SNR) of the reproducing signal at the time of the reproducing, and the error occurs during the reproducing, so that the reproducing of the entire data was not completed, the evaluation result of the reproducing test was "B". The obtained evaluation results are shown in Table 1. Further, the magnetic tape was extracted from each magnetic tape cartridge subjected to the recording and reproducing tests as described above, and the tape width difference ($W_{inner}-W_{outer}$) and the tape width deformation rate was obtained according to the above described method. The obtained tape width difference ($W_{inner}-W_{outer}$) and tape width deformation rate were shown in Table 1 as a value after long-term storage (a reference value).

The results of the above evaluation are shown in Table 1 (Table 1-1 and Table 1-2).

thinned magnetic tape (Comparative Examples 1 to 3), in a case of forming the servo pattern such that the servo band intervals are the same between the inner portion and the outer portion without means for controlling the tape width difference, the reproducing error occurs. This is because, as a result of the tape width difference ($W_{inner}-W_{outer}$) becoming large after long-term storage, the servo band interval in the inner portion becomes wider than the servo band interval in the outer portion after long-term storage, and the servo band intervals between the inner portion and the outer portion becomes significantly different (see the reference value in Table 1).

TABLE 1-1

|  | Unit | Example 1 | Example 2 | Example 3 | Example 4 | Example 5 | Example 6 | Example 7 | Example 8 |
|---|---|---|---|---|---|---|---|---|---|
| Type of non-magnetic support | — | PEN | PEN | PEN | PET | PA | PEN | PEN | PEN |
| Tape thickness | μm | 5.2 | 5.2 | 5.2 | 5.2 | 5.2 | 5.2 | 5.2 | 5.2 |
| Type of ferromagnetic powder | — | BaFe | BaFe | BaFe | BaFe | BaFe | SrFe1 | SrFe2 | ε-iron oxide |
| Heat treatment temperature | °C. | 45 | 70 | 45 | 45 | 45 | 45 | 45 | 45 |
| Tape width deformation rate | ppm | 400 | 50 | 400 | 400 | 400 | 400 | 400 | 400 |
| Tape width difference ($W_{inner} - W_{outer}$) | μm | 4.1 | 19.9 | 4.1 | 4.1 | 4.1 | 4.1 | 4.1 | 4.1 |
| Servo band interval difference ($G_{inner} - G_{outer}$) | μm | 0.0 | 0.0 | -3.9 | 0.0 | 0.0 | 0.0 | 0.0 | 0.0 |
| Recording and reproducing test — Recording test | — | A | A | A | A | A | A | A | A |
| Recording and reproducing test — Reproducing test | — | A | A | A | A | A | A | A | A |
| Reference value: tape width difference ($W_{inner} - W_{outer}$) after long-term storage | μm | 20.0 | 20.0 | 20.0 | 20.0 | 20.0 | 20.0 | 20.0 | 20.0 |
| Reference value: servo band interval difference ($G_{inner} - G_{outer}$) after long-term storage | μm | 3.9 | 0.0 | 0.1 | 3.9 | 3.9 | 3.9 | 3.9 | 3.9 |

TABLE 1-2

|  | Unit | Reference Example 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Type of non-magnetic support | — | PEN | PEN | PET | PA | PEN | PEN | PEN | PEN |
| Tape thickness | μm | 6.0 | 5.2 | 5.2 | 5.2 | 5.2 | 5.2 | 5.2 | 5.2 |
| Type of ferromagnetic powder | — | BaFe | BaFe | BaFe | BaFe | BaFe | BaFe | BaFe | BaFe |
| Heat treatment temperature | °C. | None |  |  |  | 40 | 80 | 60 | 60 |
| Tape width deformation rate | ppm | 350 | 500 | 500 | 500 | 450 | 30 | 400 | 400 |
| Tape width difference ($W_{inner} - W_{outer}$) | μm | 0.0 | 0.0 | 0.0 | 0.0 | 4.0 | 20.0 | 4.2 | 4.2 |
| Servo band interval difference ($G_{inner} - G_{outer}$) | μm | 0.0 | 0.0 | 0.0 | 0.0 | 0.0 | 0.0 | -4.0 | 0.1 |
| Recording and reproducing test — Recording test | — | A | A | A | A | A | B | B | A |
| Recording and reproducing test — Reproducing test | — | A | B | B | B | B | — | — | B |
| Reference value: tape width difference ($W_{inner} - W_{outer}$) after long-term storage | μm | 10.0 | 20.0 | 20.0 | 20.0 | 20.0 | 20.0 | 20.0 | 20.0 |
| Reference value: servo band interval difference ($G_{inner} - G_{outer}$) after long-term storage | μm | 2.5 | 5.0 | 5.0 | 5.0 | 4.0 | 0.0 | 0.0 | 4.1 |

From the comparison between Examples 1 to 8 and Comparative Examples 1 to 7, it is confirmed that in the thinned magnetic tape, the tape width difference between the inner portion and the outer portion is controlled so that the tape width difference ($W_{inner}-W_{outer}$) falls within the above range as the value on the 100th day from the date of magnetic tape cartridge manufacture, and the servo pattern is formed so that the servo band interval difference ($G_{inner}-G_{outer}$) falls within the above range, and therefore, occurrence of the reproducing error and the error during recording can be suppressed.

Further, in comparison with Reference Example 1 and Comparative Examples 1 to 3, it is confirmed that in the One aspect of the invention is effective in the technical fields of various data storage.

What is claimed is:

1. A magnetic tape cartridge of a single reel type in which a magnetic tape is wound around a reel,
   wherein the magnetic tape includes a non-magnetic support and a magnetic layer containing a ferromagnetic powder, and has a tape thickness of 5.3 μm or less,
   the magnetic layer includes a plurality of servo bands,
   a difference $W_{inner}-W_{outer}$ between a tape width $W_{inner}$ at a position of 50 m±1 m from a tape inner end and a tape width $W_{outer}$ at a position of 50 m±1 m from a tape outer end is 4.1 µm to 19.9 µm as a value measured on 100th day from a date of magnetic tape cartridge manufacture, and a difference $G_{inner}-G_{outer}$ between a servo band interval $G_{inner}$ in a range of 49 m to 51 m from the tape inner end and a servo band interval $G_{outer}$ in a range of 49 m to 51 m from the tape outer end is −3.9 µm to 0.0 µm as a value measured on 100th day from a date of magnetic tape cartridge manufacture.

2. The magnetic tape cartridge according to claim 1, wherein a tape width deformation rate of the magnetic tape measured within 20 minutes, after the magnetic tape is stored in a dry environment at a temperature of 52° C. for 24 hours in a state where a load of 100 g is applied in a tape longitudinal direction and the load is removed, is 400 ppm or less, and the tape width deformation rate is a value obtained by starting the storage on 100th day from the date of magnetic tape cartridge manufacture.

3. The magnetic tape cartridge according to claim 1, wherein the magnetic tape includes a non-magnetic layer containing a non-magnetic powder between the non-magnetic support and the magnetic layer.

4. The magnetic tape cartridge according to claim 1, wherein the magnetic tape includes a back coating layer containing a non-magnetic powder on a surface side of the non-magnetic support opposite to a surface side thereof provided with the magnetic layer.

5. The magnetic tape cartridge according to claim 1, wherein the non-magnetic support is a polyethylene naphthalate support.

6. The magnetic tape cartridge according to claim 1, wherein the non-magnetic support is an aromatic polyamide support.

7. The magnetic tape cartridge according to claim 1, wherein the non-magnetic support is a polyethylene terephthalate support.

8. The magnetic tape cartridge according to claim 1, wherein the ferromagnetic powder is a hexagonal barium ferrite powder.

9. The magnetic tape cartridge according to claim 1, wherein the ferromagnetic powder is a hexagonal strontium ferrite powder.

10. The magnetic tape cartridge according to claim 1, wherein the ferromagnetic powder is an ε-iron oxide powder.

11. A magnetic tape device comprising:
the magnetic tape cartridge according to claim 1; and
a magnetic head.

12. The magnetic tape device according to claim 11, wherein a tape width deformation rate of the magnetic tape measured within 20 minutes, after the magnetic tape is stored in a dry environment at a temperature of 52° C. for 24 hours in a state where a load of 100 g is applied in a tape longitudinal direction and the load is removed, is 400 ppm or less, and the tape width deformation rate is a value obtained by starting the storage on 100th day from the date of magnetic tape cartridge manufacture.

13. The magnetic tape device according to claim 11, wherein the magnetic tape includes a non-magnetic layer containing a non-magnetic powder between the non-magnetic support and the magnetic layer.

14. The magnetic tape device according to claim 11, wherein the magnetic tape includes a back coating layer containing a non-magnetic powder on a surface side of the non-magnetic support opposite to a surface side thereof provided with the magnetic layer.

15. The magnetic tape device according to claim 11, wherein the non-magnetic support is a polyethylene naphthalate support.

16. The magnetic tape device according to claim 11, wherein the non-magnetic support is an aromatic polyamide support.

17. The magnetic tape device according to claim 11, wherein the non-magnetic support is a polyethylene terephthalate support.

18. The magnetic tape device according to claim 11, wherein the ferromagnetic powder is a hexagonal barium ferrite powder.

19. The magnetic tape device according to claim 11, wherein the ferromagnetic powder is a hexagonal strontium ferrite powder.

20. The magnetic tape device according to claim 11, wherein the ferromagnetic powder is an ε-iron oxide powder.

* * * * *